US012130072B2

(12) United States Patent
Oh et al.

(10) Patent No.: US 12,130,072 B2
(45) Date of Patent: Oct. 29, 2024

(54) MULTI-JOINT LINK HINGE AND REFRIGERATOR INCLUDING THE SAME

(71) Applicants: LG Electronics Inc., Seoul (KR); EPTech Co., Ltd., Gyeonggi-do (KR)

(72) Inventors: Changseok Oh, Seoul (KR); Chunho Byun, Gyeonggi-do (KR)

(73) Assignees: LG Electronics Inc., Seoul (KR); EPTech Co., Ltd., Gyeonggi-do (KR)

( * ) Notice: Subject to any disclaimer, the term of this patent is extended or adjusted under 35 U.S.C. 154(b) by 239 days.

(21) Appl. No.: 17/339,553

(22) Filed: Jun. 4, 2021

(65) Prior Publication Data

US 2022/0034577 A1 Feb. 3, 2022

(30) Foreign Application Priority Data

Jul. 30, 2020 (KR) ........................ 10-2020-0095446
Aug. 18, 2020 (KR) ........................ 10-2020-0103132

(51) Int. Cl.
*F25D 23/02* (2006.01)
*E05D 3/06* (2006.01)

(52) U.S. Cl.
CPC ............. *F25D 23/028* (2013.01); *E05D 3/06* (2013.01); *E05Y 2900/31* (2013.01); *F25D 2323/024* (2013.01)

(58) Field of Classification Search
CPC ... F25D 23/028; F25D 2323/024; E05D 3/06; E05D 3/16; E05D 2003/166;
(Continued)

(56) References Cited

U.S. PATENT DOCUMENTS 7,987,558 B2 8/2011 Beckmann et al.
8,807,673 B2 * 8/2014 Benigni ................ F25D 23/065 312/401
(Continued)

FOREIGN PATENT DOCUMENTS

CN 101111655 1/2008
CN 101512272 8/2009
(Continued)

OTHER PUBLICATIONS

Extended European Search Report in European Appln. No. 21178693.4, dated Mar. 17, 2022, 12 pages.
(Continued)

*Primary Examiner* — Hiwot E Tefera
(74) *Attorney, Agent, or Firm* — Fish & Richardson P.C.

(57) ABSTRACT

A multi-joint link hinge includes a hinge bracket, a plurality of links axially coupled to the hinge bracket, and a door bracket coupled to the plurality of links. The hinge bracket includes a base portion that defines a plurality of screw coupling holes at a vertical surface thereof, a plurality of side portions that extend from the base portion in a horizontal direction and are spaced apart from each other in a vertical direction, and a side surface portion that extends from the base portion in the vertical direction and defines a fixing groove. The plurality of links are coupled between the plurality of side portions along an axis that extends in the vertical direction. The multi-joint link hinge is used for a home appliance including refrigerators.

15 Claims, 34 Drawing Sheets

(58) Field of Classification Search
CPC ... E05D 2011/0072; E05D 3/14; E05D 11/00; E05D 11/0054; E05D 3/08; E05D 3/18; E05Y 2900/31; E05Y 2201/686; E05Y 2600/626; E05Y 2600/56; E05Y 2201/11
See application file for complete search history.

(56) References Cited

U.S. PATENT DOCUMENTS

| | | | | |
|---|---|---|---|---|
| 10,876,335 | B2 * | 12/2020 | Byun | E05D 5/0276 |
| 2002/0002758 | A1 * | 1/2002 | Stura | H01R 39/643 16/287 |
| 2002/0166208 | A1 * | 11/2002 | Kondo | H04N 1/00554 16/289 |
| 2008/0276422 | A1 | 11/2008 | Beckmann | |
| 2010/0101052 | A1 | 4/2010 | Waltemate | |
| 2010/0269293 | A1 * | 10/2010 | Wisniewski | E05D 3/14 16/382 |
| 2011/0089801 | A1 * | 4/2011 | Bonomie | F25D 23/028 16/249 |
| 2016/0195325 | A1 * | 7/2016 | Kim | E05D 11/0054 312/405 |
| 2017/0191744 | A1 * | 7/2017 | Koo | F25D 29/005 |
| 2018/0156530 | A1 * | 6/2018 | Akman | E05D 11/00 |
| 2018/0283066 | A1 * | 10/2018 | Lee | E05F 15/616 |
| 2019/0368247 | A1 * | 12/2019 | Carbone | E05D 3/14 |

FOREIGN PATENT DOCUMENTS

| | | | | |
|---|---|---|---|---|
| CN | 101663451 | | 3/2010 | |
| CN | 102062510 | | 5/2011 | |
| CN | 102561856 | | 7/2012 | |
| CN | 103673480 | | 3/2014 | |
| CN | 105637307 | | 6/2016 | |
| CN | 105758098 | | 7/2016 | |
| CN | 108825024 | | 11/2018 | |
| CN | 110374436 | | 10/2019 | |
| CN | 210239421 | | 4/2020 | |
| DE | 4418238 | | 11/1995 | |
| DE | 20120535 | | 4/2002 | |
| DE | 102020102316 | B3 * | 10/2020 | E05D 11/0054 |
| EP | 1170562 | A2 * | 1/2002 | E05D 11/0081 |
| EP | 3343152 | | 7/2018 | |
| EP | 3674504 | | 7/2020 | |
| KR | 100954093 | | 4/2010 | |
| KR | 101497295 | | 3/2015 | |
| KR | 20160099982 | | 8/2016 | |
| KR | 102070695 | | 1/2020 | |
| WO | WO-2014127846 | A1 * | 8/2014 | E05D 3/16 |
| WO | WO 2014/154252 | | 10/2014 | |
| WO | WO2018135817 | | 7/2018 | |

OTHER PUBLICATIONS

Office Action in Australian Appln. No. 2021209313, dated Jul. 31, 2022, 7 pages.

Partial European Search Report in European Appln. No. 21178693.4, dated Dec. 10, 2021, 14 pages.

Office Action in Chinese Appln. No. 202110557227.6, mailed on Jan. 12, 2023, 21 pages (with machine translation).

Office Action in Korean Appln. No. 10-2020-0095446, mailed on Sep. 25, 2023, 8 pages (with English translation).

* cited by examiner

MULTI-JOINT LINK HINGE AND REFRIGERATOR INCLUDING THE SAME

CROSS-REFERENCE TO RELATED APPLICATIONS

The present application claims priority under 35 U.S.C. 119 and 35 U.S.C. 365 to Korean Patent Application Nos. 10-2020-0095446, filed on Jul. 30, 2020, and 10-2020-0103132, filed on Aug. 18, 2020, the disclosures of which are hereby incorporated by reference in their entirety.

TECHNICAL FIELD

The present disclosure relates to a multi-joint link hinge and a refrigerator including the same.

BACKGROUND

Refrigerators are home appliances for storing food at a low temperature in an inner storage space covered by a refrigerator door. For example, the inside of the storage space may be cooled by cool air generated based on heat-exchange with refrigerant circulating in a refrigeration cycle to store the foods in an optimal state.

In some cases, the refrigerators may have an increased size and provide multi-functions according to the trends of change of dietary life and high quality expectation. In some cases, the refrigerators may include various structures and convenience devices for users' convenience.

In some cases, a built-in type refrigerator may be embedded in the furniture of the kitchen. In some cases, a plurality of refrigerators may be installed in parallel so as to provide a sense of unity as a whole and have harmony with the surrounding configuration.

In some cases, a hinge device may help to prevent an interference with adjacent components when the door rotates due to a thickness of the door in an installation type in which the refrigerator is in close contact with the wall or furniture, or the refrigerators are continuously arranged in parallel.

For example, an intermediate hinge may be provided on a front surface of a main body, and a rotation shaft vertically may extend from a horizontal support portion that protrudes between an upper door and a lower door to support a lower end of the upper door and an upper end of the lower door.

In some cases, to avoid an interference between adjacent objects when the door rotates due to a thickness of the door, the refrigerator may be installed to protrude more than the adjacent lateral objects or to be spaced a predetermined interval from the adjacent lateral objects. In these cases, the refrigerator may not have a sense of unity when the refrigerator is installed in built-in type or is installed to be continuous with adjacent furniture or home appliances.

In some examples, a hinge device may rotate so as not to interfere with adjacent objects when the door of the refrigerator rotates. For instance, a multi-link hinge may have a rotation structure that is compact and has multi-joints so that a door may not interfere with adjacent objects when mounted on a refrigerator door.

In some cases, where the refrigerator is equipped with the multi-link hinge, when the refrigerator door is opened and closed, the door may rotate in multiple axes to avoid an interference with neighboring walls or home appliances. In some cases, the door may rotate and move forward along a relatively large trajectory, which may relate to safety issues.

In some cases, a plurality of links may be exposed to a user and hit or catch the user's body.

SUMMARY

The present disclosure describes a refrigerator including a link hinge that can help to prevent a door from drooping and improve installation workability and convenience.

The present disclosure also describes a refrigerator including an upper hinge and a lower hinge that can help to avoid an interference with adjacent objects and to easily open and close an upper door and a lower door.

The present disclosure further describes a refrigerator that can provide user's safety in a refrigerator door equipped with a multi-link hinge.

The present disclosure further describes a refrigerator that can cover at least a portion of a hinge at upper and lower side of the hinge when a door is opened and closed.

According to one aspect of the subject matter described in this application, a multi-joint link hinge includes a hinge bracket, a plurality of links axially coupled to the hinge bracket, and a door bracket coupled to the plurality of links. The hinge bracket includes a base portion that defines a plurality of screw coupling holes at a vertical surface thereof, a plurality of side portions that extend from the base portion in a horizontal direction and are spaced apart from each other in a vertical direction, and a side surface portion that extends from the base portion in the vertical direction and defines a fixing groove. The plurality of links are coupled between the plurality of side portions along an axis that extends in the vertical direction.

Implementations according to this aspect can include one or more of the following features. For example, the multi-joint link hinge can include a coupling member that passes through one of the plurality of screw coupling holes. In some examples, the multi-joint link hinge can include a rotation shaft that passes through the plurality of links, where the door bracket is configured to face the hinge bracket and defines a door bracket hole at each of top and bottom surfaces thereof. The rotation shaft can pass through each door bracket hole.

In some implementations, the plurality of links can include a main link rotatably disposed at the hinge bracket, a first sub-link rotatably coupled to a first side of the main link, and a second sub-link rotatably coupled to a second side of the main link and spaced apart from the first sub-link.

According to another aspect, a multi-joint link hinge includes a hinge bracket, a plurality of links axially coupled to the hinge bracket, a door bracket coupled to the plurality of links, and a rotation shaft that passes through the plurality of links and protrudes from the top and bottom surfaces of the door bracket. The hinge bracket includes a base portion that defines a plurality of screw coupling holes at a vertical surface thereof, and a plurality of side portions that extend from the base portion in a horizontal direction and are spaced apart from each other in a vertical direction. The plurality of links are coupled between the plurality of side portions along an axis that extends in the vertical direction, and the door bracket defines a door bracket hole at each of top and bottom surfaces thereof. The rotation shaft passes through the plurality of links and the door bracket holes.

Implementations according to this aspect can include one or more of the following features. For example, the multi-joint link hinge includes a hinge plate that is disposed above or below the door bracket and defines a plate hole at a position corresponding to one of the door bracket holes, where the rotation shaft passes through the plate hole. In some examples, the hinge plate can define a hinge coupling hole that receives a coupling member.

According to another aspect, a refrigerator includes a cabinet that defines a storage space, a cabinet bracket disposed at a top surface of the cabinet or a bottom surface of the cabinet, a door configured to, based on rotating relative to the cabinet, open and close at least a portion of the storage space, and a hinge that connects the door to the cabinet. The hinge includes a hinge bracket coupled to the cabinet bracket, a door bracket disposed at a top surface of the door or a bottom surface of the door, and a plurality of links coupled between the hinge bracket and the door bracket.

Implementations according to this aspect can include one or more of the following features. For example, the hinge bracket can include a base portion and a side surface portion that extends from the base portion. The cabinet bracket can include a support portion disposed along the top surface of the cabinet, a coupling portion that extends upward from a front end of the support portion and is coupled to the base portion of the hinge bracket, and a fixing portion that extends from one end of the coupling portion and is coupled to the side surface portion of the hinge bracket.

In some implementations, the fixing portion can include a restriction protrusion that protrudes from each of upper and lower ends of the fixing portion, and the side surface portion of the hinge bracket can define a fixing groove that receives one of the restriction protrusions. In some examples, the door bracket can define a door bracket hole at each of top and bottom surfaces thereof, and the hinge can include a rotation shaft that passes through the door bracket holes and the plurality of links, where the rotation shaft protrudes from the top and bottom surfaces of the door bracket.

In some implementations, the door defines a hinge mounting portion that is disposed at an end of the door and recessed relative to the top surface of the door or the bottom surface of the door, where the hinge mounting portion is configured to mount the hinge. The hinge can further include a hinge plate that is disposed on one surface of the hinge mounting portion and screw-coupled to the hinge mounting portion by a coupling member passing though the hinge plate, and a rotation shaft that passes through the plurality of links and the hinge plate.

In some implementations, the door can include a fixing bracket disposed below the hinge mounting portion and screw-coupled to the hinge plate. In some examples, the plurality of links can include a main link rotatably disposed at the hinge bracket, a first sub-link rotatably coupled to a first side of the main link, and a second sub-link rotatably coupled a second side of the main link and spaced apart from the first sub-link.

According to another aspect, a refrigerator includes a cabinet that defines a storage space, a cabinet bracket disposed at a top surface of the cabinet, a hinge cover that covers the cabinet bracket and defines a cover opening at a front side thereof, a door that is configured to, based on rotating relative to the cabinet, open and close at least a portion of the storage space and that defines a hinge mounting portion recessed from a top surface of the door, a door bracket disposed at the hinge mounting portion, a hinge bracket disposed at the cabinet bracket, a plurality of links that connect the hinge bracket to the door bracket, and an upper cover disposed at the hinge mounting portion and configured to cover the hinge bracket. A portion of the upper cover is configured to insert into the cover opening based on the door being closed.

Implementations according to this aspect can include one or more of the following features. For example, the upper cover is configured to overlap with the top surface of the cabinet based on the door being closed. In some examples, the hinge mounting portion can be defined at an end of the door, and the upper cover can protrude rearward relative to a rear end of the hinge mounting portion.

In some implementations, the refrigerator can further include a lower cover that extends rearward from a bottom surface of the hinge mounting portion and is configured to cover a lower side of the hinge bracket. In some implementations, the hinge cover can be disposed on the top surface of the cabinet and accommodates the cabinet bracket, and the upper cover can include an extending end that is configured to, based on the door being closed, face the cabinet and insert into the cover opening.

In some implementations, the upper cover can include a plurality of coupling protrusions and a cover rib. The coupling protrusions and the cover rib can extend downward from a bottom surface of the upper cover and be configured to cover a space between the upper cover and the hinge bracket.

The details of one or more implementations are set forth in the accompanying drawings and the description below. Other features will be apparent from the description and drawings, and from the claims.

DETAILED DESCRIPTION

Hereinafter, detailed implementations will be described in detail with reference to the accompanying drawings. However, the scope of the present disclosure is not limited to proposed implementations of the present disclosure, and other regressive or other implementations included in the scope of the spirits of the present disclosure can be easily proposed through addition, change, deletion, and the like of other elements.

Figure 1:
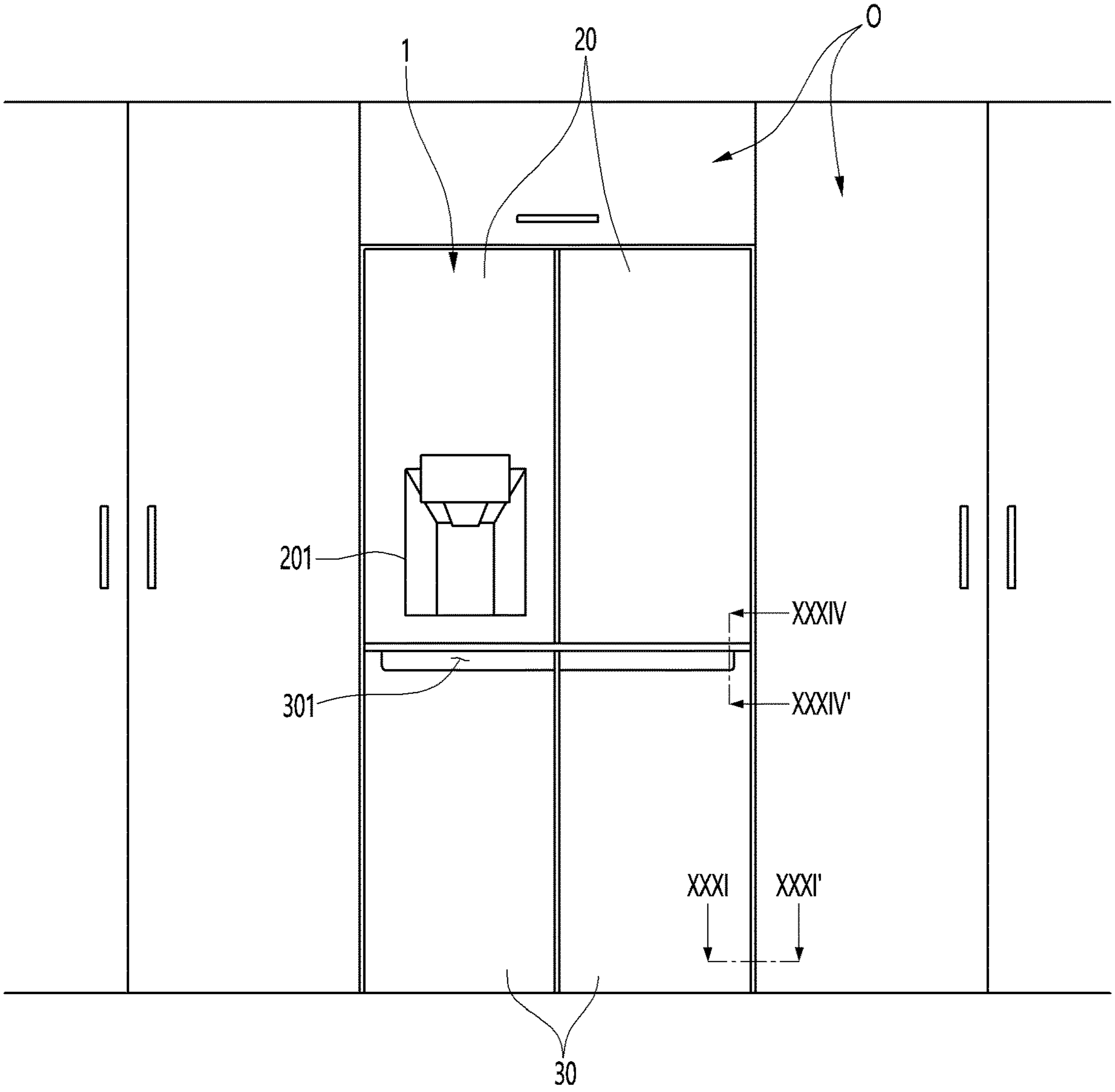
FIG. 1 is a perspective view illustrating an example of a refrigerator.

In the present disclosure, a direction facing a front surface of the door illustrated in FIG. 1 can be defined as a front direction. A direction facing the insider of the refrigerator with respect to the front surface of the door will be defined as a rear direction. A direction facing a bottom surface on which the refrigerator is installed will be defined as a downward direction, and a direction that is away from the bottom surface will be defined as an upward direction.

Figure 2:
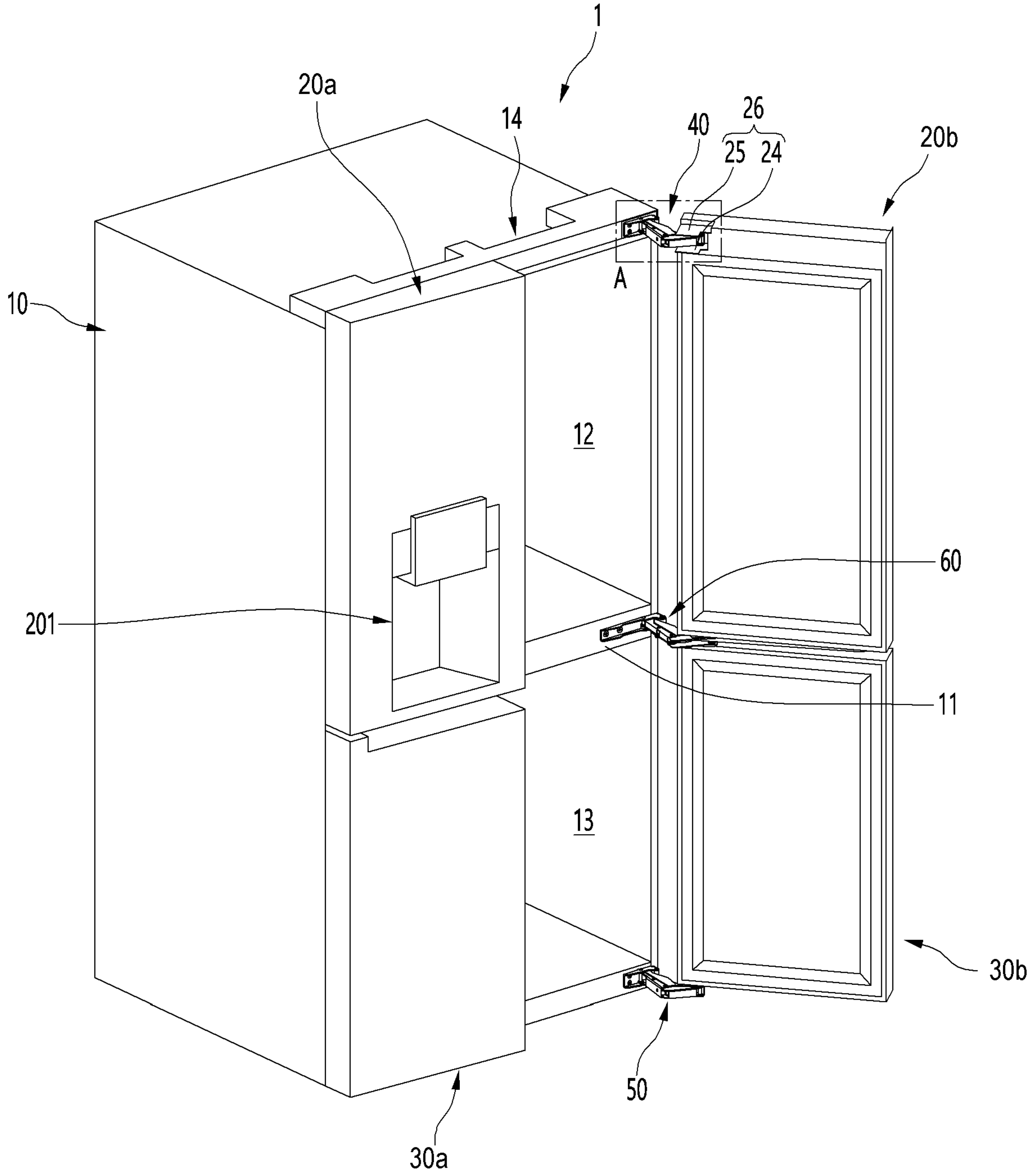
FIG. 2 is a perspective view illustrating examples of an upper door and a lower door that are open.

FIG. 1 is a perspective view illustrating an example of a refrigerator. In some examples, FIG. 2 is a perspective view illustrating examples of an upper door and a lower door that are opened.

Referring to the drawings, a refrigerator 1 includes a cabinet 10 defining a storage space having an opened front surface and a door opening or closing the storage space. Here, an outer appearance of the refrigerator 1 can be defined by a cabinet 10 and doors 20 and 30.

In some examples, the refrigerator 1 can be mounted so as to harmonize with furniture or wall O of an indoor space. For example, as illustrated in FIG. 1, the refrigerator 1 can be installed in the indoor space such as a kitchen and can be disposed adjacent to the furniture or the wall O to harmonize with each other. That is, a space corresponding to a size of the refrigerator 1 can be provided in the furniture or the wall O, and the refrigerator 1 can be accommodated or disposed in a built-in type. Of course, a plurality of refrigerators 1 can be continuously disposed, or other home appliances can be continuously disposed, in addition to the furniture or the wall O.

In such an arrangement structure of the refrigerator 1, a front surface of the refrigerator 1, i.e., front surfaces of the doors 20 and 30 can be very close to the furniture or the wall O and be disposed on the same or adjacent plane to realize a sensor of unity. And, in some cases, the front surface of the doors 20 and 30 can be made of the same material or a material having the same texture as the furniture or the wall O to realize a sense of unity with the furniture or the wall O.

Looking in more detail with respect to a structure of the refrigerator 1, the cabinet 10 can define a storage space that is partitioned vertically. For example, the cabinet 10 can be partitioned vertically by a barrier 11 to define an upper storage space 12 above the barrier 11 and a lower storage space 13 below the barrier 11. For example, the refrigerator 1 can be provided in a bottom freeze type, and thus, the upper storage space 12 can be used as a refrigerating compartment, and the lower storage space 13 can be used as a freezing compartment. Thus, the upper storage space 12 can be referred to as a refrigerating compartment, and the lower storage space 13 can be referred to as a freezing compartment.

The present disclosure can be applied to all types of refrigerators provided with a door that opens and closes a storage space by rotating regardless of the types of refrigerators. In this application, however, a bottom free type refrigerator will be described as an example for convenience of explanation and understanding.

The doors 20 and 30 can include an upper door 20 and a lower door 30, which open and close the upper storage space 12 and the lower storage space 13, respectively. The upper door 20 can be rotatably mounted on the cabinet 10 to open and close the upper storage space 12 by the rotation thereof. For this, upper and lower ends of the upper door 20 can be supported by an upper hinge 40 and a center hinge 60, respectively, and the upper door 20 can rotate by the upper hinge 40 and the center hinge 60 to open and close each of the storage spaces 12 and 13.

The upper door 20 can be provided in a pair on both left and right sides, and each of the upper doors 20 can independently rotate to open and close the upper storage space 12. In some examples, the upper hinge 40 and the center hinge 60 can be coupled to the pair of upper doors 20 disposed on both left and right sides, respectively, and can be rotatably mounted to the cabinet 10. The pair of upper doors 20 can include a left upper door 20*a* and a right upper door 20*b*.

In some examples, a dispenser 201 that is capable of dispensing water or ice at the outside of the upper door 20 in a state in which the upper door 20 is closed can be provided on the upper door 20.

The lower door 30 can be rotatably mounted on the cabinet 10 to open and close the lower storage space 13 by the rotation thereof. For this, upper and lower ends of the lower door 30 can be supported by the center hinge 60 and a lower hinge 50, respectively, and the lower door 30 can rotate by the center hinge 60 and the lower hinge 50 to open and close each of the lower storage space 13.

The lower door 30 can be provided in a pair on both left and right sides, and each of the lower door 30 can independently rotate to open and close the lower storage space 13. In some examples, the center hinge 60 and the lower hinge 50 can be coupled to the pair of lower doors 30 disposed on both the left and right sides, respectively, and can be rotatably mounted to the cabinet 10. The pair of lower doors 30 can include a left lower door 30*a* and a right lower door 30*b*.

In some implementations, the refrigerator 1 can include a handle or a handle space 301 into which a user's hand can be inserted. For example, the handle or the handle space 301 can be provided between a lower end of the upper door 20 and an upper end of the lower door 30. In some examples, a handle for manipulating the opening and closing of the upper door 20 and the lower door 30 can be disposed on a top surface of the handle space 301, i.e., a bottom surface of the upper door 20 and a bottom surface of the handle space 301, i.e., a top surface of the lower door 30. For example, the handle can be recessed in a groove shape.

The upper hinge 40, the center hinge 60, and the lower hinge 50 can rotate in the same trajectory, and a multi-link structure can be provided so that the upper door 20 and the lower door 30 smoothly rotate without an interference with the furniture or the wall O while opened and closed.

In some examples, a hinge cover 14 can be disposed on the top surface of the cabinet 10. The hinge cover 14 can extend from a left end to a right end of the cabinet 10 and can be configured to completely accommodate the cabinet bracket 48 connected to the upper hinge 40 disposed on each of both left and right sides. In addition, when the cabinet bracket 48 is integrated with the upper hinge 40, a portion of the upper hinge 40 fixed to the cabinet 10 can be accommodated inside the hinge cover 14.

The hinge cover 14 can define a circumferential surface extending downward along a circumference of the top surface and can define a space with an opened bottom surface. Accordingly, a space capable of accommodating the cabinet bracket 48 can be defined inside the hinge cover 14.

A front surface 140 of the hinge cover 14 can be disposed on the same plane as a front surface of the cabinet 10. In some examples, a cover opening 141 can be defined in each of both sides of the front surface 140 of the hinge cover 14. The cover opening 141 can be opened at a position corresponding to the upper hinge 40, and the cabinet bracket 48 can be exposed to be connected to the upper hinge 40.

Hereinafter, the mounting structure of the upper hinge will be described in more detail with reference to the drawings. In addition, for convenience of understanding and explanation, the upper door 20 will be referred to as a door 20, and the upper hinge 40 will be referred to as a hinge 40.

Figure 3:
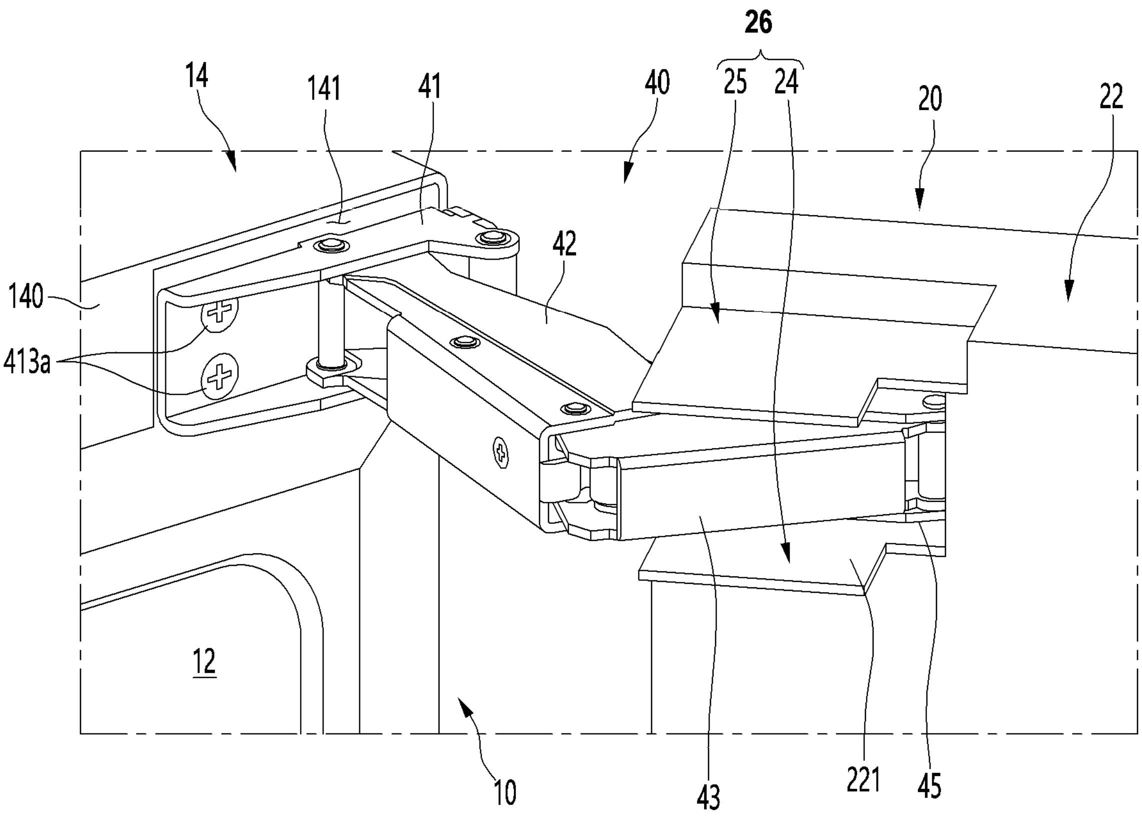
FIG. 3 is an enlarged view illustrating portion A of FIG. 2.
Figure 4:
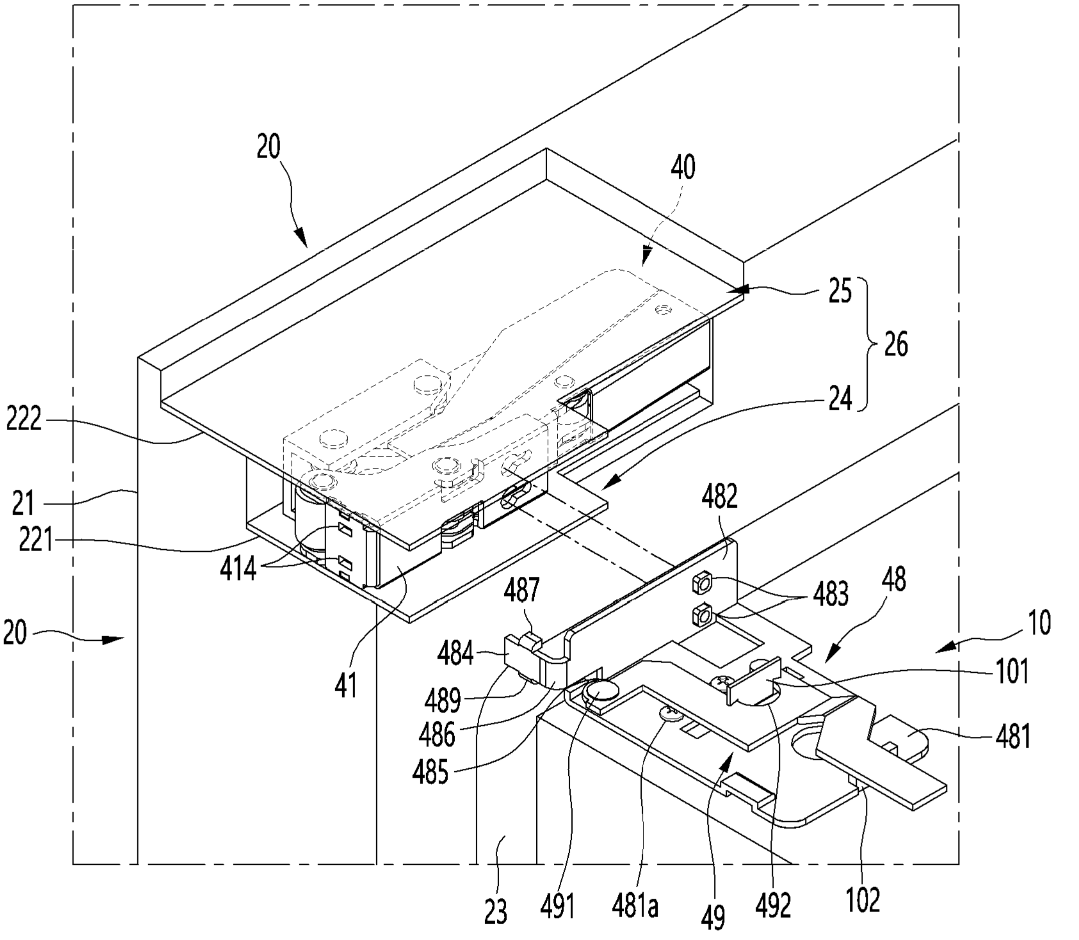
FIG. 4 is an exploded perspective view illustrating an example of a coupling structure of the door and a hinge.
Figure 5:
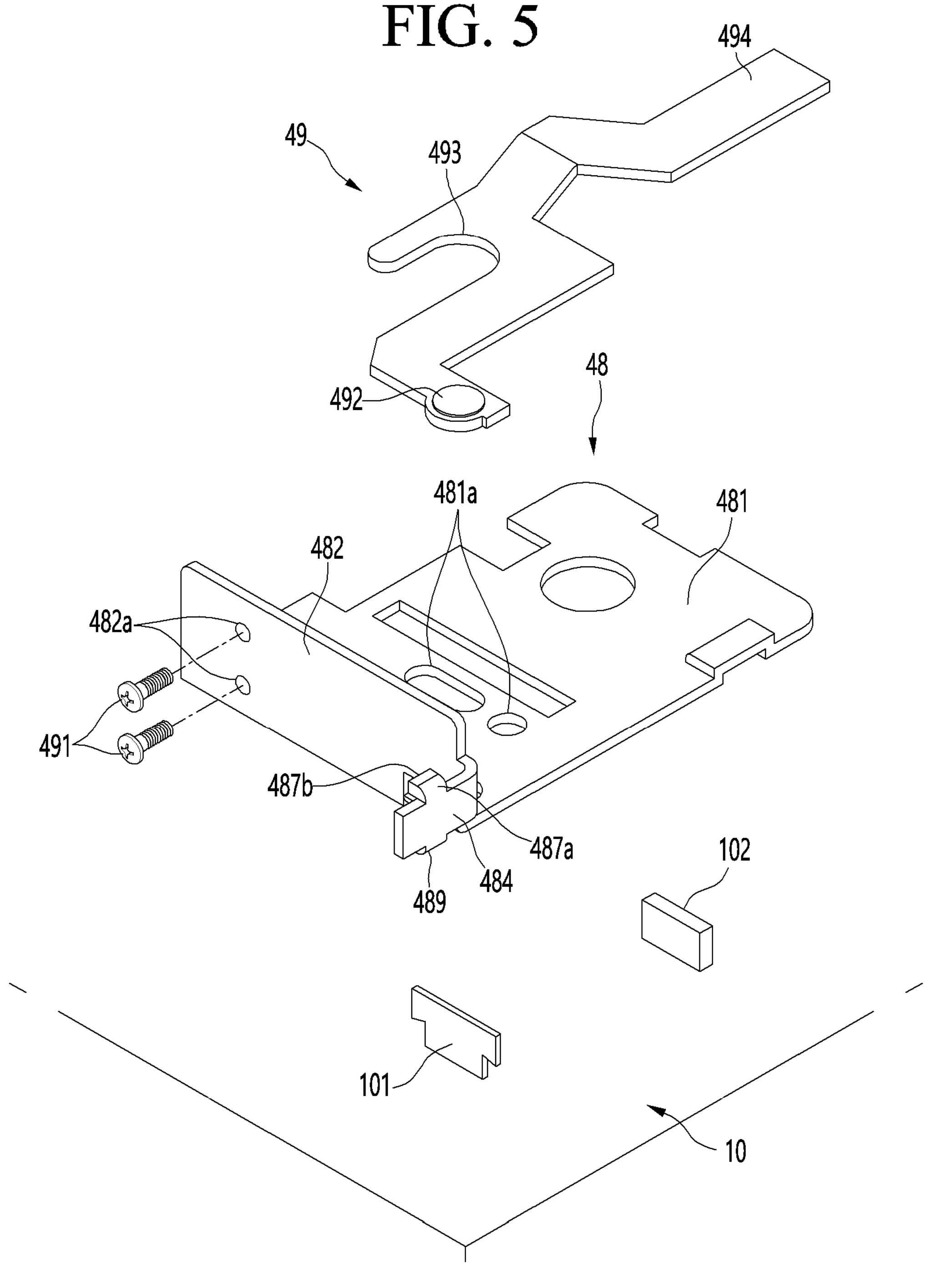
FIG. 5 is a perspective view illustrating an example of a cabinet bracket.

FIG. 3 is an enlarged view illustrating portion A of FIG. 2. FIG. 4 is an exploded perspective view illustrating an example coupling structure of the door and the hinge. FIG. 5 is a perspective view illustrating the cabinet bracket.

In some implementations, the cabinet bracket 48 can be mounted on the top surface of the cabinet 10. The cabinet bracket 48 can be configured to allow the hinge 40 to be fixed and mounted on the top surface of the cabinet 10 and can be accommodated inside the hinge cover 14.

The cabinet bracket 48 can include a support portion 481, a coupling portion 482, and a fixing lever 49.

In detail, the cabinet bracket 48 can be made of a plate-shaped metal material and can be bent to provide the support portion 481 and the coupling portion 482. The support portion 481 can be seated on the top surface of the cabinet 10 and can be penetrated by first and second coupling ribs 101 and 102 protruding from the top surface of the cabinet 10.

In addition, the fixing lever 49 can be rotatably mounted on the support portion 481 by a rotation shaft 491. The fixing lever 49 can have a rib restriction groove 492 that is capable of restricted with the first coupling rib 101 when rotating. Thus, the cabinet bracket 48 can be selectively restricted to the top surface of the cabinet 10 according to the rotational operation of the fixing lever 49.

In some examples, a coupling member 481*a* such as a screw can be coupled to the support portion 481, and the coupling member 481*a* can pass through the support portion 481 and be coupled to the top surface of the cabinet 10 so that the cabinet bracket 48 is more firmly coupled to the cabinet 10.

The coupling portion 482 can be vertically bent upward from a front end of the support portion 481. The coupling portion 482 can define a surface facing the hinge bracket 41 of the hinge, and can be exposed forward through the cover opening 141. Thus, the hinge 40 can be disposed on the same plane as the front surface of the cabinet 10.

In some examples, the coupling portion 482 can be coupled to the hinge bracket 41 of the hinge 40. For example, a through-hole 413 can be defined in the hinge bracket 41, and a coupling hole 483 can be defined in the corresponding coupling portion 482. Thus, a screw 413*a* can sequentially pass through the through-hole 413 and the coupling hole 483 so that the hinge bracket 41 is coupled to the front surface of the coupling portion 482.

A fixing portion 484 can be disposed on one end of the coupling portion 482. The fixing portion 484 can be vertically bent forward from a side end of the coupling portion 482 and can extend to support one side surface of the hinge bracket 41.

In some examples, restriction protrusions 487 and 489 protruding laterally can be further disposed on upper and lower ends of the fixing portion 484. Each of the restriction protrusions 487 and 489 can be inserted into a fixing groove 414 defined in one side surface of the hinge bracket 41. Thus, the hinge bracket 41 can be further restricted by the fixing portion 484, and the cabinet bracket 48 can be maintained in the state of being firmly fixed and mounted. Particularly, each of rear and side surfaces of the hinge bracket 41 can be respectively restricted by the screw 413*a* and the restriction protrusions 487 and 489 and thus can be firmly fixed and mounted without moving even if the opening/closing of the heavy door 20 is performed.

The hinge 40 can include a door bracket 45 coupled to the door 20. In some examples, the door bracket 45 can be mounted on the top surface of the door 20 so that the door 20 is opened and closed according to the operation of the hinge 40.

The door 20 can include an outer case 21 defining a front surface, a door liner 23 defining a rear surface, and a cap decoration 22 defining a top surface and a bottom surface of the door 20. In some examples, a foam liquid can be injected into a space defined by a combination of the outer case 21, the door liner 23, and the cap decoration 22 to provide an insulator.

One end of the cap decoration 22 defining the top surface of the door 20 can be recessed to provide a space in which the hinge 40 is mounted. That is, a hinge mounting portion 221 on which the hinge 40 is mounted can be recessed in the top surface of the cap decoration 22. In some examples, a cover mounting portion 222 on which the cover member 26 shielding the hinge 40 is mounted can be disposed on an upper side of the hinge mounting portion 221.

In detail, the hinge mounting portion 221 and the cover mounting portion 222 can be recessed from the top surface of the cap decoration 22 and can be sequentially provided in a stepped shape. That is, the hinge mounting portion 221 can be disposed further downward than the cover mounting portion 222 and can be disposed further behind the cover mounting portion 222.

The hinge mounting portion 221 is recessed downward, and the bottom thereof can be provided in a flat shape. In some examples, the screw passing through the door bracket 45 can be coupled to the bottom surface of the hinge mounting portion 221 to fix one end of the hinge.

The hinge mounting portion 221 can have a length corresponding to a horizontal length of the hinge 40 and can have a width corresponding to a width of the hinge 40 in a front and rear direction. That is, when the door 20 is closed, and thus, the hinge 40 is fully folded, the hinge 40 can be accommodated inside the hinge mounting portion 221.

In some examples, a height difference between the hinge mounting portion 221 and the upper cover mounting portion 222 can be greater than a thickness of the hinge 40. Therefore, the hinge 40 can be disposed in an inner region of the hinge mounting portion 221, and the cover member 26 mounted on the cover mounting portion 222 can be disposed above the hinge 40. Thus, even when the door 20 is opened and closed, the cover member 26 may not interfere with the hinge 40.

The cover mounting portion 222 can be disposed above the hinge mounting portion 221 and can be recessed downward from a top surface of the cap decoration 22. In some examples, a recessed depth of the cover mounting portion 222 can be greater than a thickness of the cover member 26.

In some examples, the bottom surface of the cover mounting portion 222 can be provided in a flat shape, and the bottom surface of the cover mounting portion 222 can support the cover member 26 from a lower side. The cover mounting portion 222 can be disposed along a front end of the hinge mounting portion 221 and one end connected to the front end of the hinge mounting portion 221. Thus, when the cover member 26 is mounted, the cover mounting portion 222 can support two surfaces of the cover member 26 to ensure stable mounting of the cover member 26.

In the state in which the cover member 26 is mounted on the cover mounting portion 222, a front upper end of the door can protrude more than the cover member 26. That is, the upper end of the door 20 can extend higher than the top surface of the cover member 26 to shield the cover member 26 so as not to be exposed forward. In some examples, the hinge 40 disposed further lower than the cover member 26 can also be naturally shielded without being exposed through the front surface of the door 20.

The cover member 26 can extend backward from the hinge mounting portion 221, i.e., toward the cabinet 10 to shield at least a portion of the hinge 40 having the multi-link structure.

The cover member 26 can be provided in a plate shape and disposed above and below the hinge 40 to help to prevent the hinge 40 from being exposed. Particularly, in the process of opening and closing the hinge 40, a space between a plurality of links constituting the hinge 40 can be shielded to help to prevent a safety accident such as jamming of a user's finger.

The cover member 26 can include an upper cover 25 extending forward from an upper end of the hinge mounting portion 221, i.e., a bottom surface of the cover mounting portion 222 and a lower cover 24 extending forward from the bottom surface of the hinge mounting portion 221. In some examples, the upper cover 25 and the lower cover 24 can extend backward from the inside of the hinge mounting portion 221 to protrude more than a rear end of the hinge mounting portion 221.

That is, the hinge mounting portion 221 can be provided with an upper cover 25 and a lower cover 24, and the hinge 40 can be provided between the upper cover 25 and the lower cover 24 to prevent the main portions of the hinge 40 from being exposed upward and downward.

The cover member 26 can be made of a plate-shaped material and mounted on the hinge mounting portion 221 and the cover mounting portion 222. In some examples, the cover member 26 can be integrated with the cap decoration 22. That is, during injection-molding of the cover member 26 made of a plastic material, the cover member 26 can be integrally molded. In some examples, the lower cover 24 can be integrally molded with the cap decoration 22, and the upper cover 25 can be separately molded to be mounted on the cover mounting portion 222.

In some cases, the cover member 26 can be provided with only one of the upper cover 25 and the lower cover 24. That is, the cover member 26 can be configured to shield only one of the upper and lower sides of the hinge 40.

In some examples, the cover member 26 can be provided on the lower end of the door 20 as well as the upper end of the door 20 and can be configured to shield the center hinge 60 or the lower hinge 40.

Hereinafter, the structure and operation of the hinge will be described in more detail with reference to the drawings.

Figure 6:
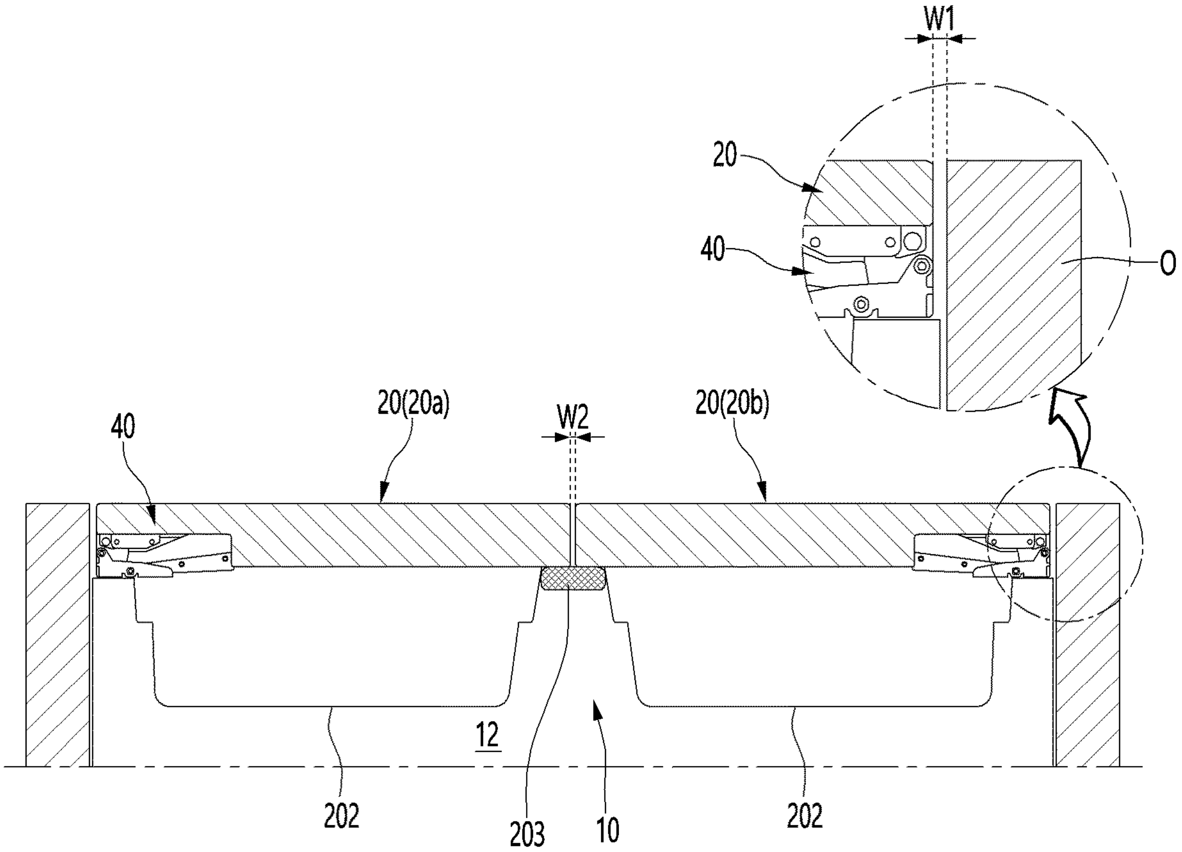
FIG. 6 is a view illustrating an example state of the door, a wall, and an upper hinge in a state in which the door is closed.
Figure 7:
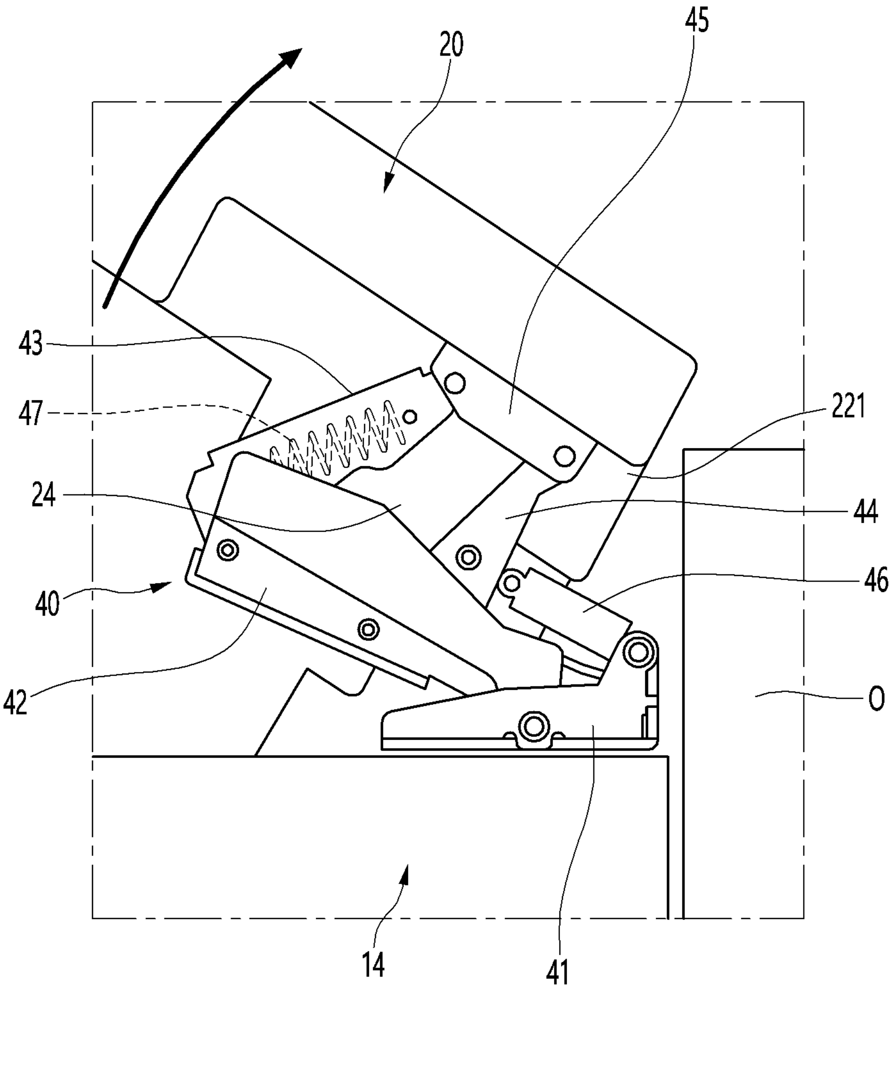
FIG. 7 is view illustrating an example state of the door, the wall, and the upper hinge in a state in which the door is opened from the closed state illustrated in FIG. 6.
Figure 8:
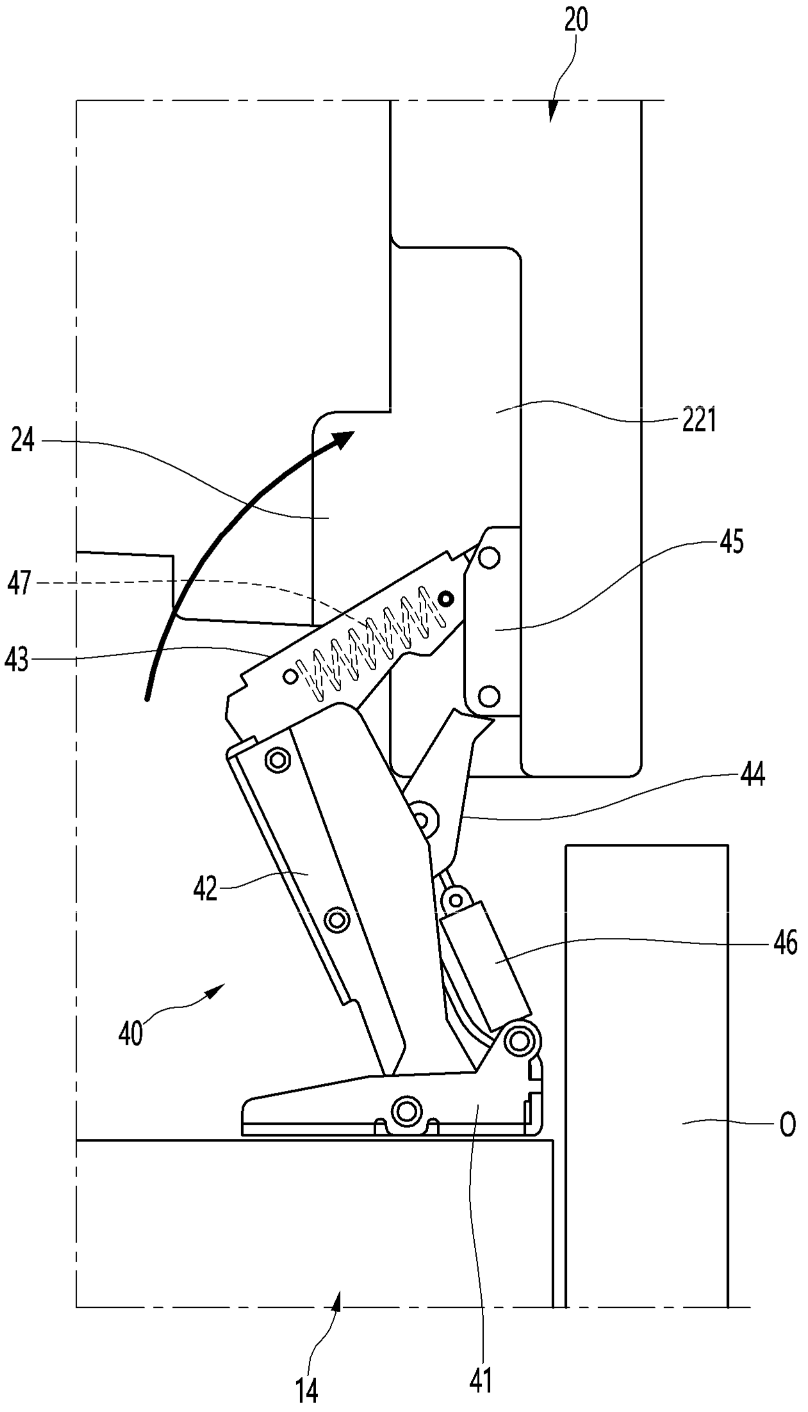
FIG. 8 is view illustrating an example state of the door, the wall, and the upper hinge in a state in which the door is further opened from the state illustrated in FIG. 7.
Figure 9:
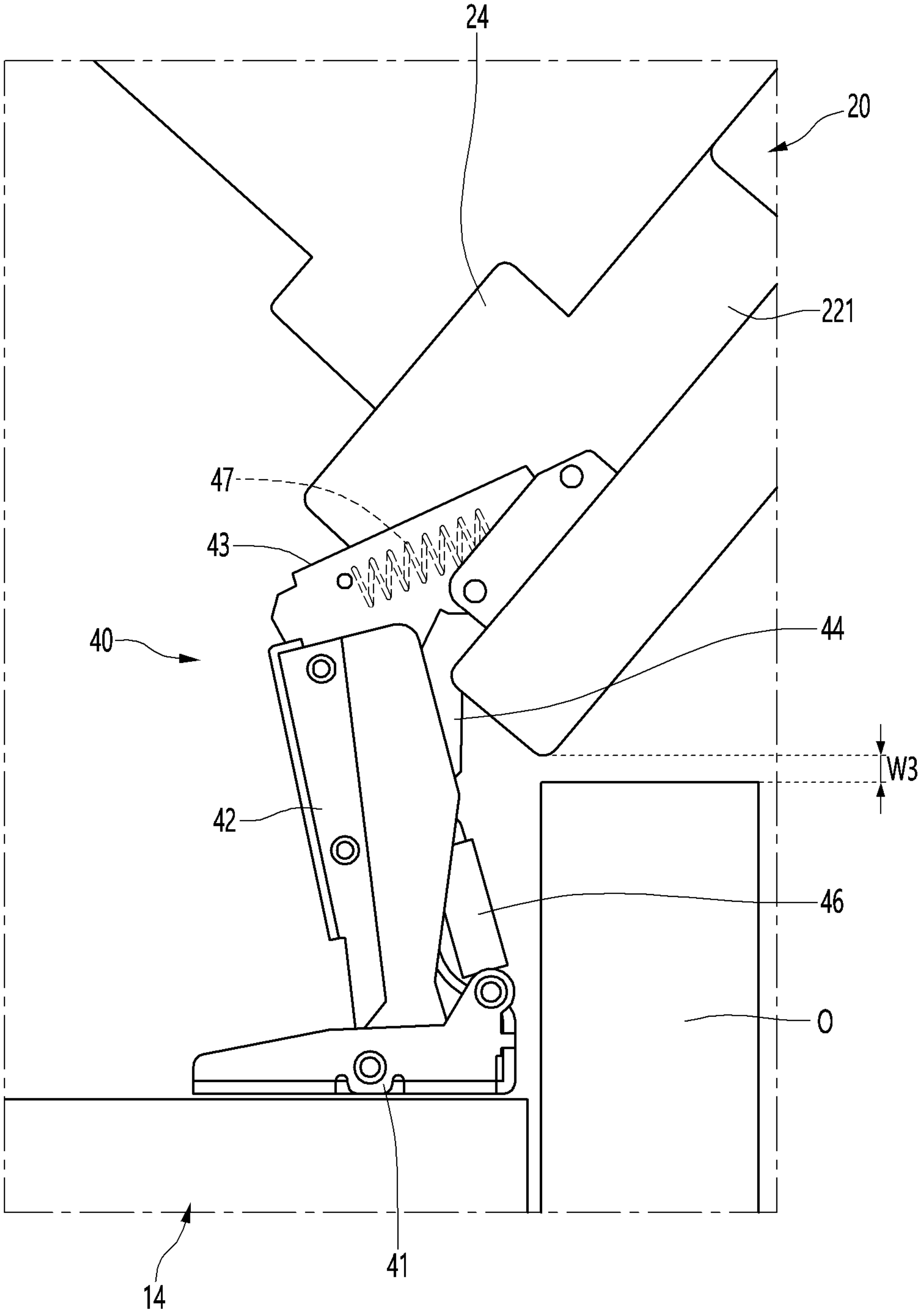
FIG. 9 is a view illustrating an example state of the door, the wall, and the upper hinge in a state in which the door is fully opened.

FIG. 6 is a view illustrating an example state of the door, a wall, and the upper hinge in a state in which the door is closed. FIG. 7 is view illustrating an example state of the door, the wall, and the upper hinge in a state in which the door is opened from the state illustrated in FIG. 6. FIG. 8 is view illustrating an example state of the door, the wall, and the upper hinge in a state in which the door is further opened compared to the state illustrated in FIG. 7. FIG. 9 is a view illustrating an example state of the door, the wall, and the upper hinge in a state in which the door is fully opened.

In some implementations, the hinge 40 can be mounted at a corner defined by an upper front end and a side end of the cabinet 10 and can be connected to one end of a top surface of the door 20.

The hinge 40 can have a structure in which a plurality of links are coupled to each other, and thus, when the hinge 40 rotates, the door 20 can rotate while moving in a direction away from the front surface of the cabinet 10.

The rotation trajectory of the door 20 can be determined by the structure of the plurality of links constituting the hinge 40, and a trajectory in which a pair of doors 20 disposed side by side and the furniture or wall O disposed at one side do not interface with each other can be implemented. Thus, the hinge 40 can be referred to as a multi-link, link hinge, or a multi-joint link hinge.

In some examples, the hinge 40, the lower hinge 50, and the center hinge 60 can have the same structure or a structure having the same rotation trajectory. Thus, the door 20 and the lower door 30 can rotate with the same rotation trajectory.

Looking at the structure of the hinge 40 in more detail, the hinge 40 can include a hinge bracket 41 mounted on the cabinet bracket 48, a main link 42 axially coupled to the hinge bracket 41, a first sub-link 43 and a second sub-link 44, which are axially coupled to the main link 42, and a door bracket 45 which is axially coupled to ends of the first sub-link 43 and the second sub-link 44 and is coupled to the door 20.

Each of the links 42, 43, 44, and 45 can be axially coupled to define a quadrilateral shape as a whole and can be folded or unfolded to provide a trajectory through which the door rotates. In some examples, the hinge bracket 41 and the second sub-link 44 can be connected to each other by a linear damper 46 having both ends that are axially coupled to each other. The linear damper 46 can reduce rotation when the hinge 40 is folded, i.e., when the door 20 is closed to alleviate an impact.

In some examples, the first sub-link 43 can be provided with a spring 47 that is tensioned or compressed according to the rotation of the first sub-link 43 to force the rotation of the first sub-link 43. The spring 47 can be a compression spring or a tension spring. The spring 47 can be compressed while the door 20 is closed and can be restored immediately before the door 20 is closed. Thus, the spring 47 can assist the rotation of the first sub-link 43 at the moment at which the door 20 is closed by the spring 47. Therefore, the door 20 can be effectively closed even when the linear damper 46 operates.

In some examples, the plurality of links 42, 43, 44, and 45 constituting the hinge 40 can rotate while maintaining a set trajectory by the action of the linear damper 46 and the spring 47.

The pair of doors 20 can be disposed side by side on the front surface of the upper storage space 12. In some examples, the front surface of the door 20 can be spaced a set interval W1 from the furniture or the wall O disposed at both sides of the refrigerator 1. For example, the set interval W1 can be about 3 mm. Thus, while ensuring the initial rotation of the door 20 so as not to interfere, in the state in which the door 20 is closed, a space between the door 20 and the furniture or the wall O can be narrowed to realize the sense of unity.

The upper storage space 12 is shielded by the pair of doors 20, and the left and right doors 20 can independently rotate by the hinges 40, respectively.

Thus, a spaced space has to be defined between the left and right doors 20. In detail, the pair of doors 20 can have mutually independent rotational structures and can be spaced a set interval W2 from each other so as not to interfere with the rotation of the adjacent door 20 while the door 20 rotates. For example, the set interval W2 can be about 7 mm to about 8 mm. The set interval can be set differently according to a thickness of the door 20.

In some examples, a pillar 203 can be provided between the pair of doors 20 to shield the spaced space between the pair of doors 20. For example, the pillar 203 can be rotatably mounted to the door 20 on either side of the pair of doors 20. In some examples, the pillar 203 can be unfolded by a guide provided on the cabinet 10 while the door 20 is closed. In some examples, as illustrated in FIG. 6, when the door 20 is fully closed, the pillar 203 can be unfolded to shield the space between the doors 20. (The pillar may also be referred to as a filler.)

In some examples, while the door 20 is opened, the pillar 203 can be folded by the guide provided on the cabinet 10 and may not interfere with other doors 20. In some examples, when the door 20 rotates, the door 20 may not interfere with the furniture or the wall O.

In detail, the hinge 40 rotates from the fully folded state of FIG. 6 to the state of FIG. 7 according to the rotation operation of the door 20. Here, while the door 20 is opened by a set angle, the door 20 can rotate while moving forward, and the pillar 203 can also rotate while moving forward so as not to interfere with other doors 20 disposed in parallel thereto. In some examples, a left end of the door 20 can also be maintained to be spaced apart from the furniture or the wall O so as not to interfere with each other. For this, the main link 42, the first sub-link 43, the second sub-link 44, and the door bracket 45, which constitute the upper hinge 40, can start to rotate.

In some examples, as illustrated in FIG. 8, the door 20 can gradually rotate to be opened. Here, the main link 42, the first sub-link 43, the second sub-link 44, and the door bracket 45 can rotate so that the end of the door 20 rotates so as not to interfere with the furniture or the wall O. That is, even when the door 20 rotate to be disposed parallel to the side surface of the cabinet 10, the end of the door 20 can rotate by the hinge 40 so as not to interfere with the furniture or the wall O.

As illustrated in FIG. 9, the door 20 can rotate up to a maximum open state at a set angle (for example, an angle between the front surface of the door and the front surface of the cabinet is about 130°). When the door 20 is fully opened, access to a storage member such as shelves and drawers inside the cabinet 10 is easy, and when the storage member is pulled in and out, the storage member can rotate up to an angle at which the storage member does not interfere with the door 20.

That is, when the door 20 fully rotates, the door 20 can be opened at the set angle so that an interference between the structure such as a door dike protruding along a circumference of a rear surface of the door 20 and the storage member disposed to be pulled in and out inside the refrigerator does not occur.

In some examples, when the door 20 fully rotates, the main link 42, the first sub-link 43, the second sub-link 44, and the door bracket 45 can rotate so that the end of the door 20 rotates so as not to interfere with the furniture or the wall O. That is, a distance between the end of the door 20 and a front surface of the furniture or the wall O can be spaced a set interval W3 from each other. For example, the set interval W3 can be within about 9 mm.

As described above, when the door 20 rotates, the door 20 can rotate by the hinge 40, and in particular, the door can rotate along the corner of the furniture or the wall O while maintaining the set interval W3 so as not to interfere with the corner of furniture or the wall O. Here, if the door 20 and the furniture or the wall O are too far from other, an interference can occur between the adjacent doors 20, and also, the user's finger or body can be caught between the door 20 and the furniture or wall O. Thus, the interval between the door 20 and the furniture or the wall O can be maintained to a set interval of about 3 mm to about 6 mm. For this, the hinge 40 is configured in a combination of the plurality of coupled link structures, the spring 47, and the linear damper 46 so that the door 20 rotates along a set trajectory while being maintained at a set interval from the adjacent door 20 and the furniture or the wall O so as to open and close the upper storage space 12.

In an implementation, the operation of the door 20, which is disposed at one side, of the pair of doors 20 will be described as a reference, but the hinges 40 having the same structure can be mounted on all of the pair of doors 20 disposed on both sides. Here, the operation thereof can also be performed in the same manner.

The hinge 40 can operate in the multi-link structure as described above to open and close the door 20. In some examples, the hinge 40 can generate a space between the plurality of links due to the characteristics of the multi-link structure, and when exposed to the user, a serious problem can occur in safety.

Thus, the door 20 can be provided with the cover member 26 to shield the hinge 40, and while the door 20 is at least opened and closed, the door 20 can be configured so that the space defined by the links 42, 43, and 44 is shielded.

Hereinafter, the cover member 26 will be described in more detail with reference to the drawings.

Figure 10:
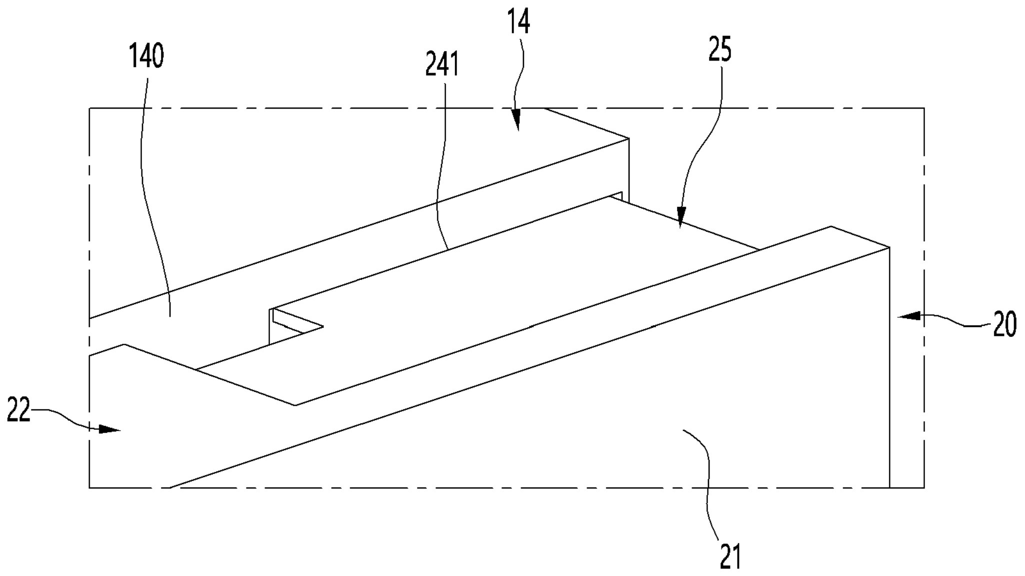
FIG. 10 is a partial perspective view illustrating an example of a hinge mounting portion of the door when viewed from an upper side.
Figure 11:
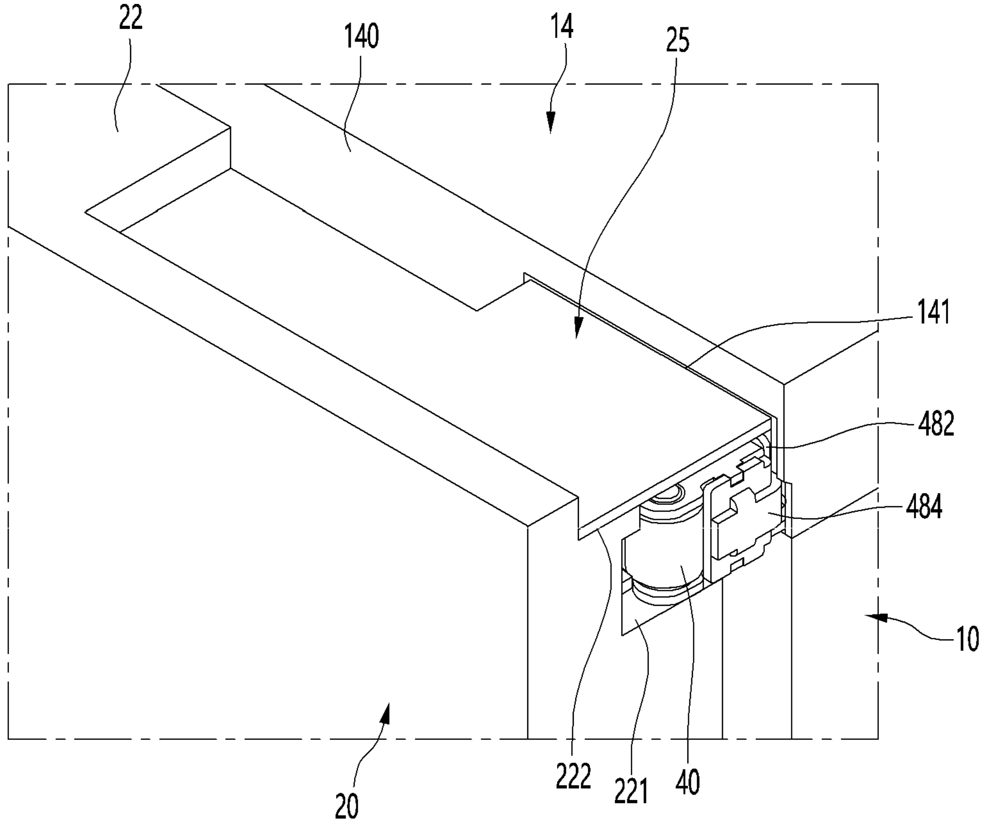
FIG. 11 is a partial perspective view illustrating the hinge mounting portion of the door when viewed from an upper side.
Figure 12:
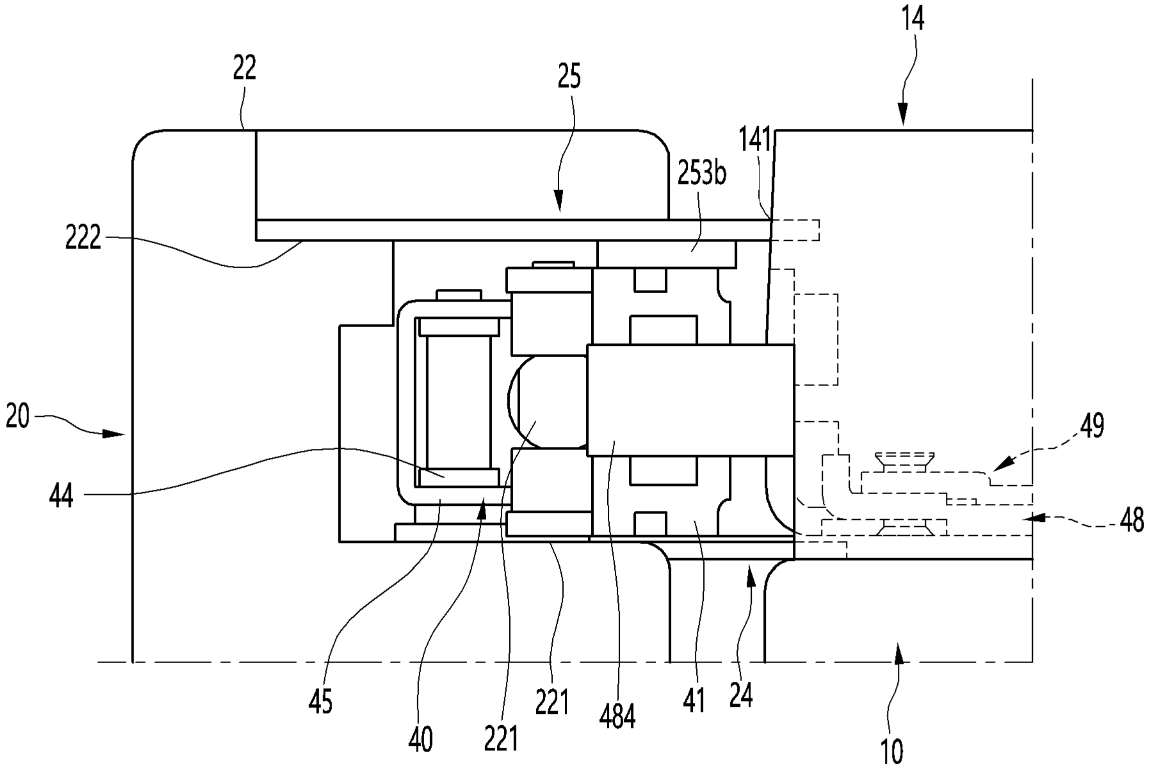
FIG. 12 is a partial side view illustrating the hinge mounting portion of the door when viewed from a side.

FIG. 10 is a partial perspective view illustrating the hinge mounting portion of the door when viewed from an upper side of one side. FIG. 11 is a partial perspective view illustrating the hinge mounting portion of the door when viewed from an upper side of the other side. FIG. 12 is a partial side view illustrating the hinge mounting portion of the door when viewed from one side.

In some implementations, the cover member can be mounted inside the hinge mounting portion recessed from the top end of the door. In some examples, the cover member can include an upper cover extending backward from an upper end of the hinge mounting portion to shield the hinge from an upper side and a lower cover extending backward from the hinge mounting portion to shield the hinge from a lower side.

In some examples, an upper end of the cap decoration defining the top surface of the door 20 can be stepped in multiple stages, and the upper cover 25 and the lower cover 24 can be mounted in a state of being vertically spaced apart from each other.

In detail, the lower cover 24 can extend backward from the bottom surface of the hinge mounting portion 221 to shield a lower side of the hinge 40 so that the bottom surface of the hinge 40 is not exposed. In some examples, the upper cover 25 can extend backward from the bottom surface of the cover mounting portion 222 to shield an upper side of the hinge 40 so that the top surface of the hinge 40 is not exposed. In some examples, the hinge 40 can be mounted on the hinge mounting portion 221 and can be disposed in a region between the upper cover 25 and the lower cover 24.

The cover member 26 can extend toward the cabinet 10 from the inside of the hinge mounting portion 221, and the extending end of the cover member 26 can further extend while passing through the top surface of the cabinet 10. Thus, when the door 20 is closed, the extending end of the cover member 26 can be inserted through the cover opening 141 of the hinge cover 14. That is, when viewed from the upper side, a rear end of the cover member 26 can overlap the top surface of the cabinet 10.

Here, the upper cover 25 can be inserted into the hinge cover 14 while passing through the upper end of the cover opening 141. In some examples, the lower cover 24 can be inserted into the hinge cover 14 while passing through the lower end of the cover opening 141, i.e., the top surface of the cabinet 10.

Thus, in the state in which the door 20 is closed, from the inside of the hinge mounting portion 221 to the front surface of the hinge cover 14 can be completely shielded to prevent the hinge 40 from being exposed. That is, the top and bottom surfaces of the hinge 40 are completely shielded to prevent foreign substances from being introduced into the hinge 40 from the outside and prevent the user's fingers or the like from being caught.

The lower cover 24 can be integrated with the cap decoration 22. That is, the lower cover 24 can be provided together when the cap decoration 22 is injection-molded. The lower cover 24 can be provided so that a front end of the bottom surface of the hinge mounting portion 221 extends toward the cabinet 10. In some examples, the lower cover 24 can be provided in a plate shape to have a size capable of shielding the hinge 40 exposed between the door and the cabinet 10. Of course, the lower cover 24 can be provided as a configuration on the hinge mounting portion 221 and then assembled and mounted on the hinge mounting portion 221.

The upper cover 25 can be mounted on the upper end of the hinge mounting portion 221. The upper cover 25 can be provided in a plate shape capable of shielding the hinge 40 from the upper side and can have a size capable of shielding the entire top surface of the hinge 40 mounted on the hinge mounting portion 221.

In some examples, the upper cover 25 can be provided in a separate plate shape and can be mounted on the cover mounting portion 222 in the state in which the hinge 40 is mounted on the hinge mounting portion 221. Therefore, when the hinge 40 needs to be separated, the upper cover 25 can be first separated from the cover mounting portion 222, and then the hinge 40 can be separated from the hinge mounting portion 221.

Hereinafter, a structure and a mounting structure of the cover member 26 will be described in more detail with reference to the accompanying drawings.

Figure 13:
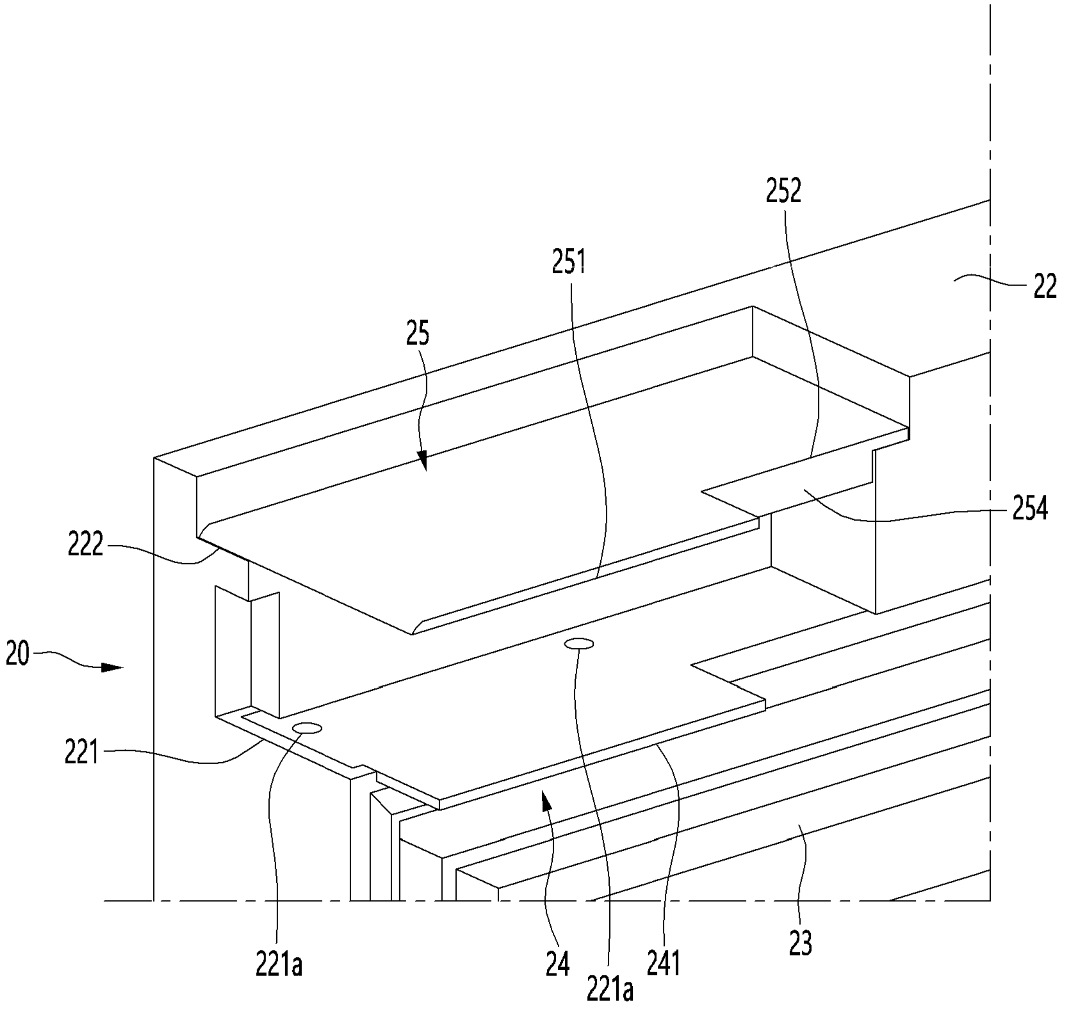
FIG. 13 is a partial perspective view illustrating an example state of an upper cover and a lower cover that are disposed on the door.
Figure 14:
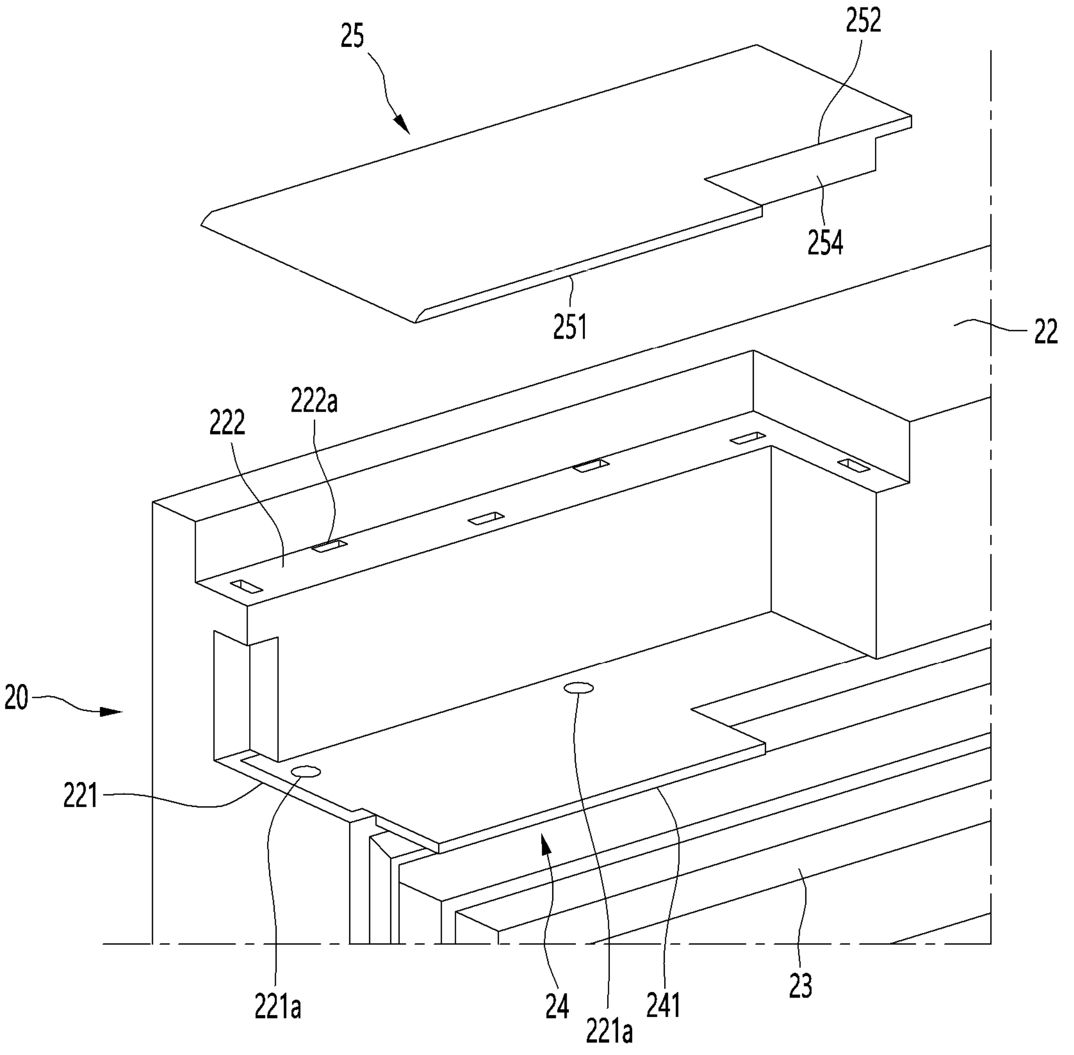
FIG. 14 is an exploded perspective view illustrating an example state of the upper cover that is separated from the door.
Figure 15:
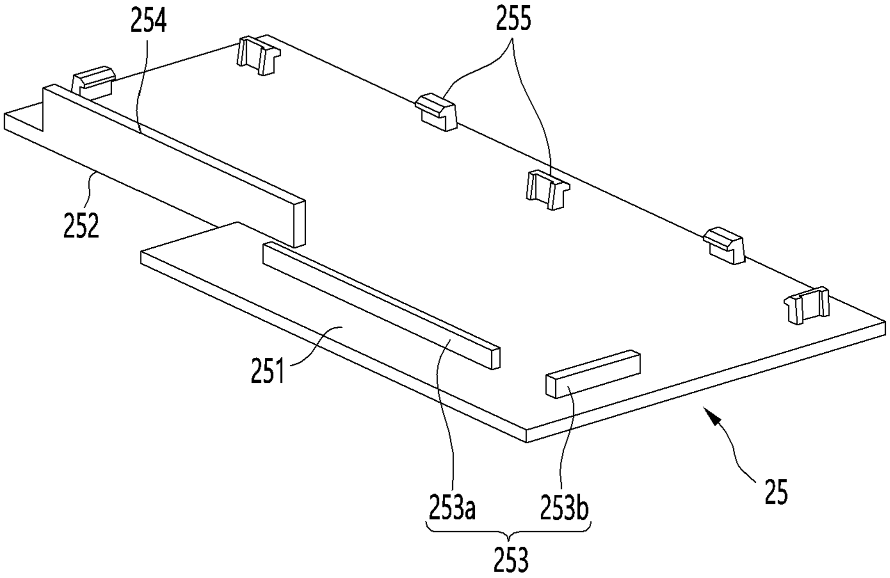
FIG. 15 is a perspective view illustrating an example of a bottom surface of the upper cover.

FIG. 13 is a partial perspective view illustrating a state in which the upper cover and the lower cover are disposed on the door. FIG. 14 is an exploded perspective view illustrating a state in which the upper cover is separated. FIG. 15 is a perspective view illustrating a bottom surface of the upper cover.

As shown in the drawings, the cover member 26 can be made of the plate-shaped plastic material and can have a size corresponding to the size of the hinge mounting portion 221.

The cover member 26 can include the lower cover 24. The lower cover 24 can define an entire bottom surface of the hinge mounting portion 221. Of course, when the lower cover 24 is integrally molded with the cap decoration 22, the lower cover can be provided in a shape that further protrudes backward from a rear end of the bottom surface of the hinge mounting portion 221.

In some examples, a screw hole 221*a* to which the screw to be coupled to the door bracket 45 is coupled can be defined in the hinge mounting portion 221 and the lower cover 24.

A horizontal length of the lower cover 24 can correspond to a length of the hinge mounting portion 221 and can have a length corresponding to a horizontal length of the hinge 40 mounted on the hinge mounting portion 221.

In some examples, a portion of a rear end of the lower cover 24 can be provided with a protrusion 241 protruding backward. The protrusion 241 can extend toward the cabinet 10 through the hinge mounting portion 221. In some examples, an extending end of the protrusion 241 can extend to be inserted into the inside of the hinge cover 14 through the cover opening 141 when the door 20 is closed. In some examples, a horizontal length of the protrusion 241 can be longer than that of the hinge bracket 41. Thus, when the door 20 is closed, the hinge bracket 41 can be shielded from the lower side by the protrusion 241.

The cover member 26 can further include an upper cover 25. The upper cover 25 can be provided in a shape corresponding to the lower cover 24. In some examples, the upper cover 25 can have a size capable of shielding the hinge 40 from the upper side and can have a size capable of shielding the hinge mounting portion 221 from the upper side.

In some examples, a rear end of the upper cover 25 can include a first end 252 and a second end 251, which are stepped with respect to each other. The first end 252 can be disposed in an inner region of the hinge mounting portion 221. In some examples, the second end 251 can protrude further forward than the first end 252 and can further extend toward the cabinet 10 by passing through the hinge mounting portion 221. For example, the second end 251 can be inserted into the hinge cover 14 through the cover opening 141 while the door 20 is closed.

In some examples, a horizontal length of the second end 251 can be longer than that of the hinge bracket 41. Thus, when the door 20 is closed, the hinge bracket 41 can be shielded from the upper side by the second end 251. The length and protrusion distance of the second end 251 can be the same as those of the protrusion 241.

The upper cover 25 can be mounted on the upper end of the hinge mounting portion 221, i.e., the cover mounting portion 222.

The cover mounting portion 222 can be disposed along the upper end of the hinge mounting portion 221 and can be stepped so that the upper cover 25 is mounted. In some examples, the cover mounting portion 222 can be disposed along front end and side ends of the hinge mounting portion 221.

In some examples, a plurality of coupling grooves **222*a* can be defined in the bottom surface of the cover mounting portion 222. The coupling groove 222*a* is defined at a position corresponding to the coupling protrusion 255 disposed on a bottom surface of the upper cover 25 and can allow the coupling protrusion 255 to be inserted and coupled. Thus, the upper cover 25 can be firmly fixed to the cover mounting portion 222, and the hinge mounting portion 221 and the hinge 40 mounted on the hinge mounting portion 221** can be shielded from the upper side.

In some examples, the cover mounting portion 222 can be disposed on the top surface of the door 20, i.e., at a position recessed rather than the top surface of the cap decoration 22, and thus, in the state in which the cover member 26 is mounted on the cover mounting portion 222, the cover member 26 and the hinge 40 can be shielded by the front surface of the door 20.

The coupling protrusion 255 can be disposed on a bottom surface of the upper cover 25. In some examples, a plurality of coupling protrusions 255 can be disposed along the front end and one end of the upper cover 25 corresponding to the cover mounting portion 222. The coupling protrusion 255 can protrude downward from the bottom surface of the upper cover 25 and can be provided in a hook shape to be inserted and coupled to the coupling groove **222*a***.

In some examples, cover ribs 253 and 254 can be disposed on the bottom surface of the upper cover 25. The cover ribs 253 and 254 can extend vertically downward from the bottom surface of the upper cover 25 extend up to the top surface of the hinge 40 to shield a space between the upper cover 25 and the hinge 40.

The cover ribs 253 and 254 can include a first rib 254 extending along the first end 252 and a second rib 253 formed along the second end 251.

The first rib 254 can extend downward from the first end 252, extend along the first end 252, and further extend by passing through the first end 252. The first rib 254 can be disposed adjacent to a top surface of the main link 42 when the door 20 is closed to prevent the user's finger or other objects from being introduced between the upper cover 25 and the main link 42.

The second rib 253 can extend downward from a region of the second end 251, but can be disposed at a position that is slightly away from an outer end of the second end 251. The second rib 253 can include a horizontal rib **253*a* and a vertical rib 253*b*, and the horizontal rib 253*a* can extend parallel to a rear end of the second end 251, and the vertical rib 253*b* can extend parallel to a side end of the second end 251**.

The horizontal rib **253*a* can be longer than a distance between the first sub-link 43 and the second sub-link 44 to prevent the finger or other objects from being introduced between the first sub-link 43 and the second sub-link 44 while the door 20** is opened and closed.

In some examples, the vertical rib **253*b* can extend in a direction crossing the horizontal rib 253*a* and can be spaced apart from the horizontal rib 253*a*. In some examples, the vertical rib 253*b* can be adjacent to the second sub-link 44 while the door 20** is opened and closed to prevent the user's fingers or other objects from being introduced into the second sub-link.

Hereinafter, states of the hinge 40 and the cover member 26 when the door 20 of the refrigerator 1 having the above structure is opened and closed will be described with reference to the drawings.

Figure 16:
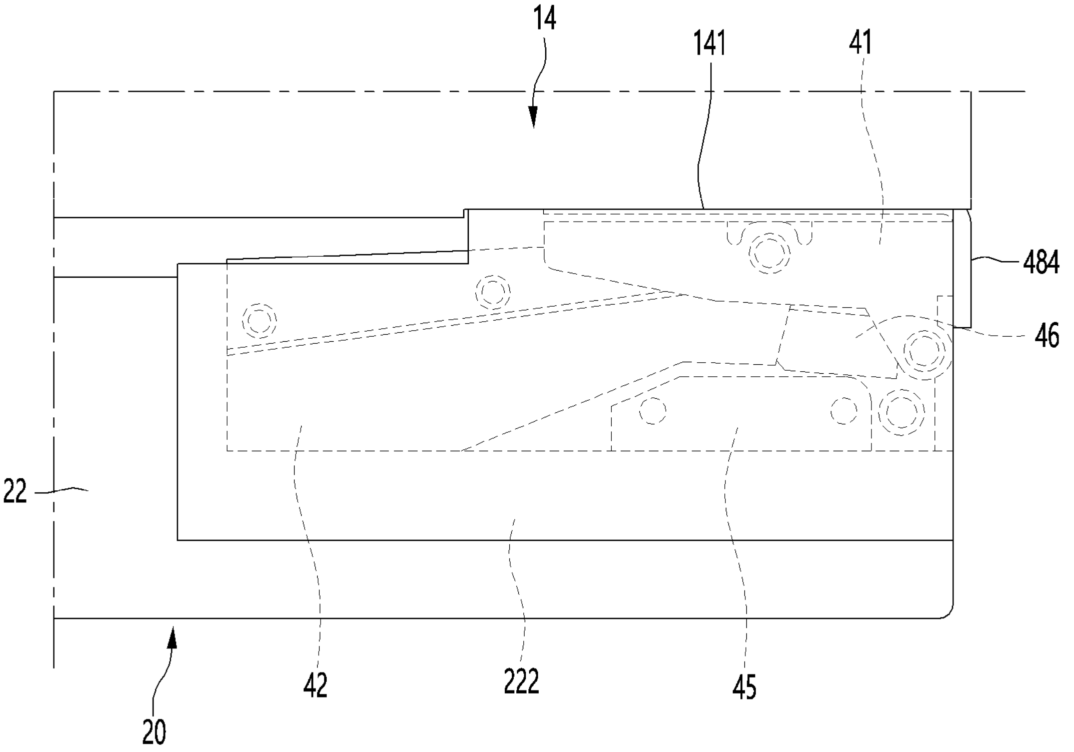
FIG. 16 is a top view illustrating an example state of the hinge when the door is closed.
Figure 17:
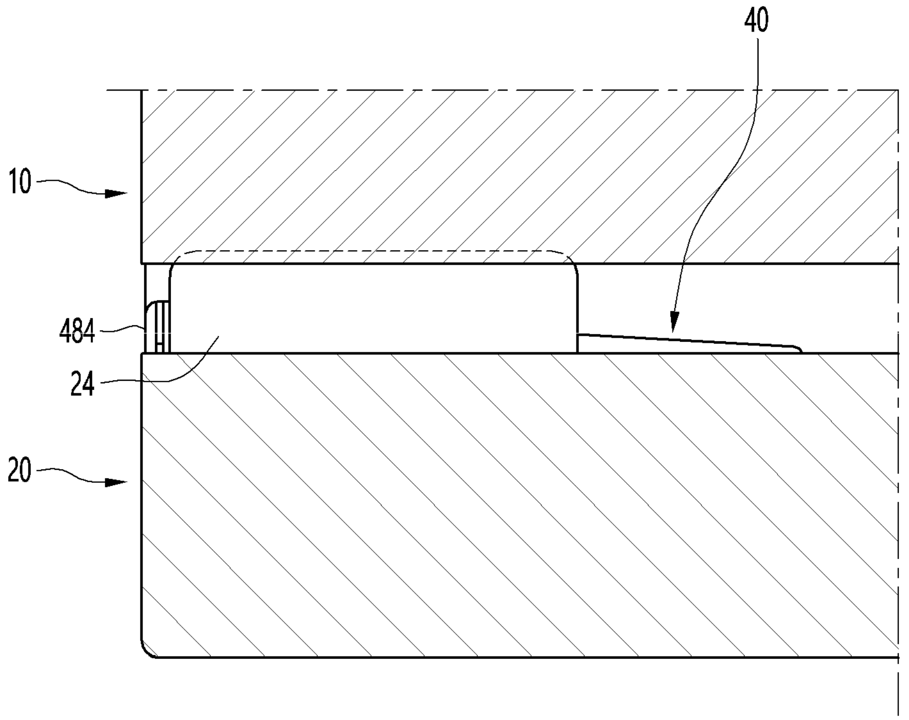
FIG. 17 is a bottom view illustrating an example state of the hinge when the door is closed.

FIG. 16 is a top view illustrating an example state of the hinge when the door is closed. FIG. 17 is a bottom view illustrating an example state of the hinge when the door is closed.

As shown in the drawings, when the door 20 is closed, the hinge 40 is fully folded and accommodated inside the hinge mounting portion 221. In some examples, the cover member 26 can completely shield the hinge 40 from the upper and lower sides to prevent the hinge 40 from being exposed.

The hinge 40 can be disposed inside the hinge mounting portion 221 in the folded state, and thus, most of the hinge brackets 41 may not be exposed, but a portion of the hinge bracket 41 mounted with the cabinet bracket 48 can protrude outward to be exposed. Here, the hinge bracket 41 can be shielded by the cover member 26 to prevent the hinge 40 from being exposed to the outside.

Particularly, both the upper cover 25 and the lower cover 24 constituting the cover member 26 can be inserted into the hinge cover 14, and thus, the hinge 40 can be shielded from the upper side by the upper cover 25, and also, the hinge 40 can be shielded from the lower side by the lower cover 24.

Thus, the user's finger or other object may not be introduced into the hinge 40, and safety problems may not occur when the door 20 is closed.

In some examples, the user can open the door 20 by manipulating the door 20 in the state in which the door 20 is closed, and the hinge 40 can operate according to the user's manipulation. In some examples, the door 20 can rotate along a trajectory provided by the hinge 40 according to the operation of the hinge 40.

Figure 18:
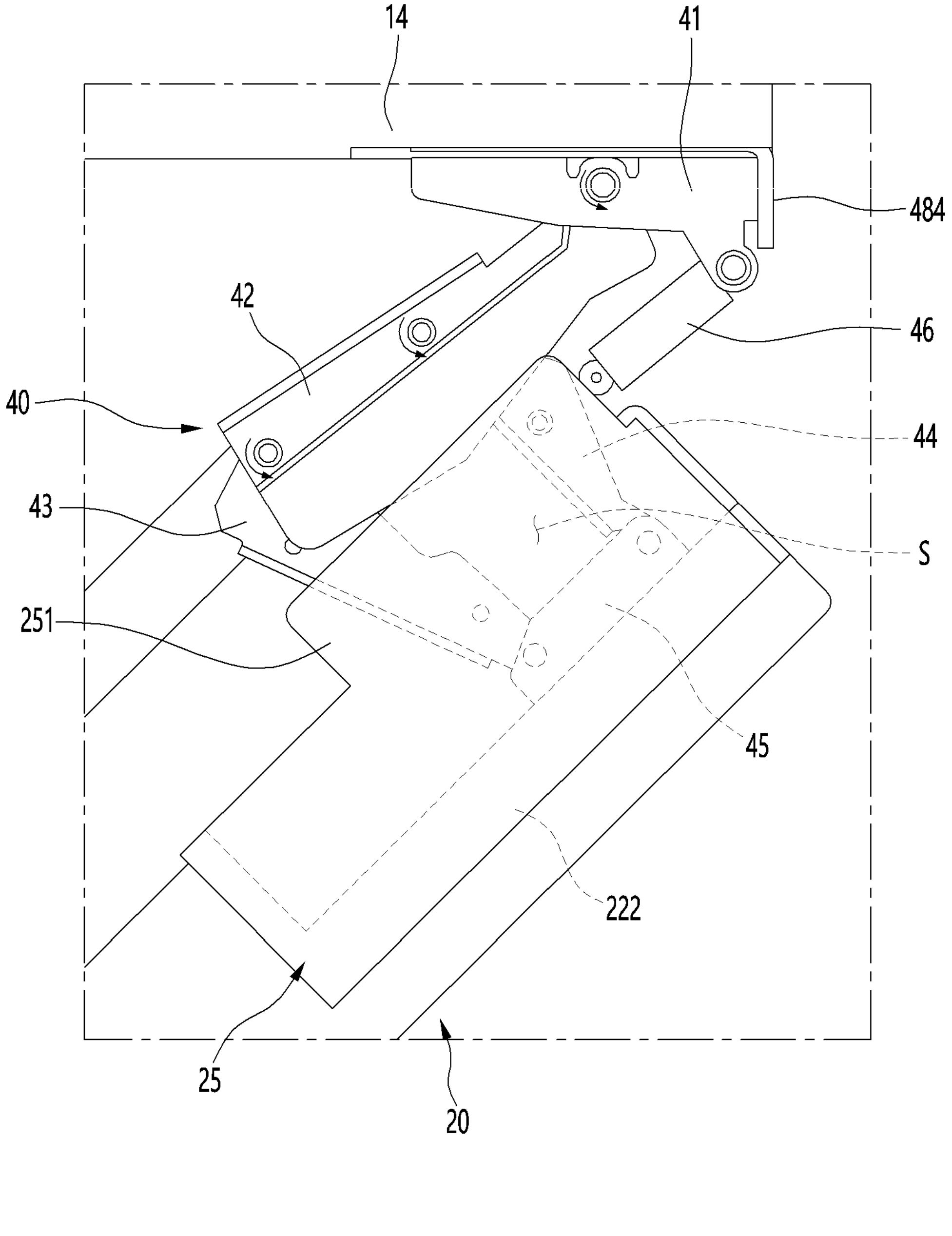
FIG. 18 is a top view illustrating an example state of the hinge when the door is opened at an angle of about 45°.
Figure 19:
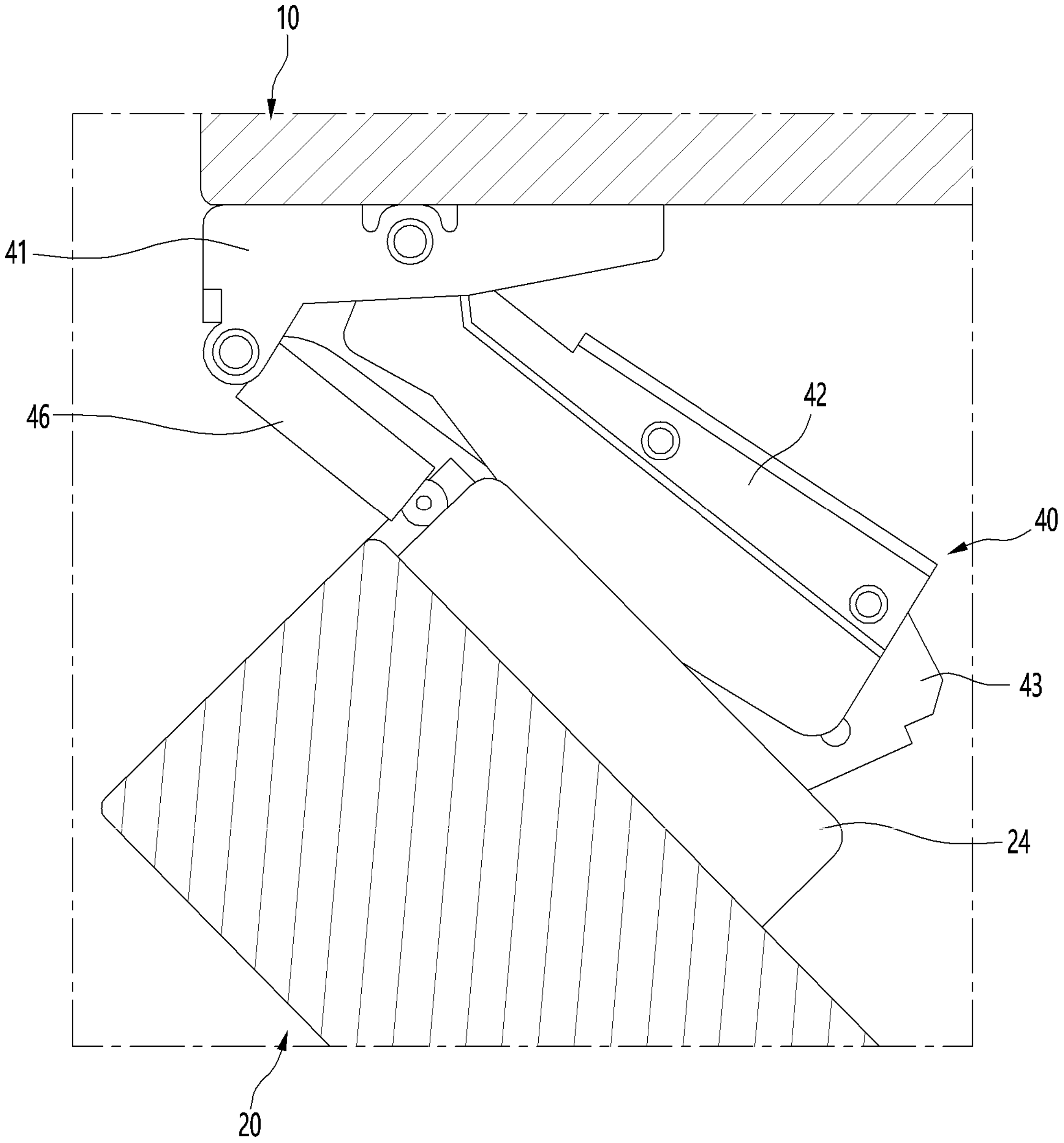
FIG. 19 is a bottom view illustrating an example state of the hinge when the door is opened at an angle of about 45°.

FIG. 18 is a top view illustrating an example state of the hinge when the door is opened at an angle of about 45°. FIG. 19 is a bottom view illustrating an example state of the hinge when the door is opened at an angle of about 45°.

In some implementations, when the door is opened, the door can be opened according to the operation of the hinge 40. In FIGS. 18 and 19, a state in which an angle between the front surface of the door 20 and the front surface of the cabinet 10 is about 45° is disclosed.

The hinge 40 can have a structure in which the door 20 rotates simultaneously while the door 20 moves forward as described above in the multi-link structure. Thus, the door 20 can rotate without colliding with the neighboring furniture or wall O.

In detail, due to the opening operation of the door 20, the hinge 40 can be in the state of FIG. 18 before the main link 42, the first sub-link 43, and the second sub-link 44 rotate in a forward direction. In some examples, a space S can be defined between the main link 42 and the first sub-link 43, the second sub-link 44, and the door bracket 45 due to the structural characteristics of the hinge 40.

Here, the upper cover 25 can shield the space S between the main link 42 and the first sub-link 43, the second sub-link 44, and the door bracket 45. Thus, when viewed from the upper side, the upper cover 25 can shield both the first sub-link 43 and the second sub-link 44 and can be in a state of extending up to the end of the main link 42.

Thus, the space S between the main link 42 and the first sub-link 43, the second sub-link 44, and the door bracket 45 may not be exposed upward, and thus, the user's fingers or other objects may not get caught in the hinge.

In some examples, the lower cover 24 can also shield the space S between the main link 42 and the first sub-link 43, the second sub-link 44, and the door bracket 45 from the lower side, like the upper cover 25.

As described above, in the state in which the door 20 is opened by an angle of about 45°, the space S between the links generated when the hinge 40 operates can be shielded by the cover member 26 so as not to be exposed, and thus, the user's safety can be ensured.

Figure 20:
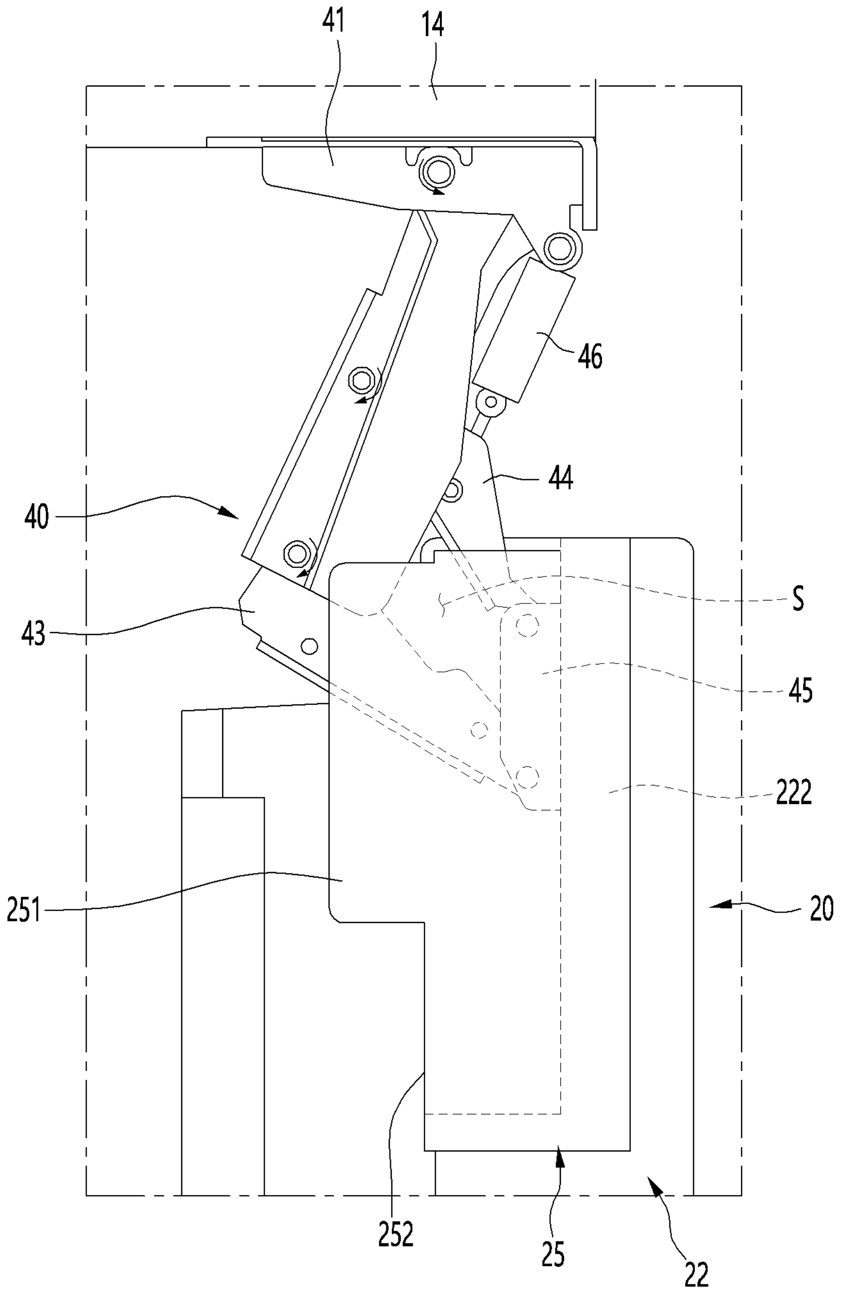
FIG. 20 is a top view illustrating an example state of the hinge when the door is opened at an angle of about 90°.
Figure 21:
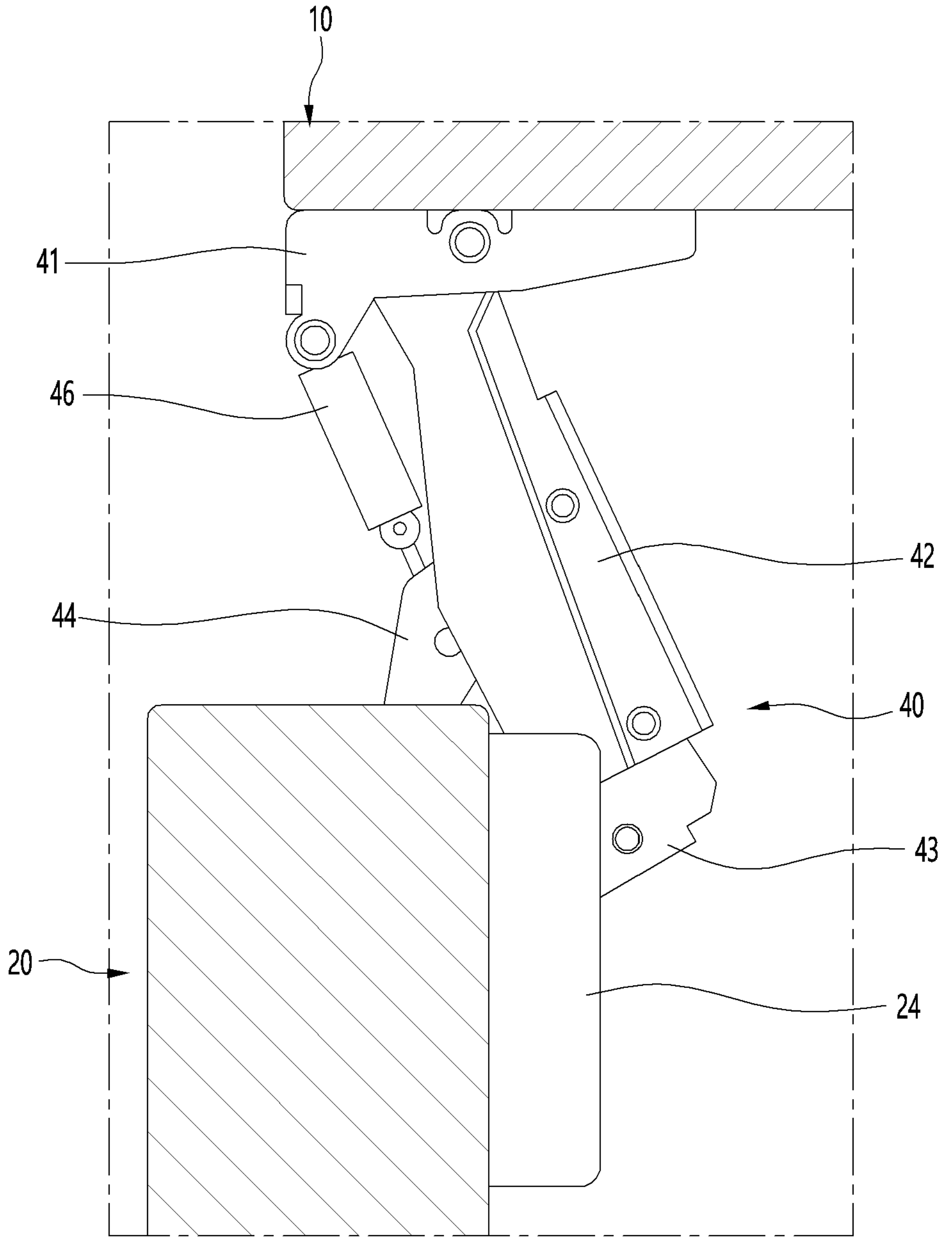
FIG. 21 is a bottom view illustrating an example state of the hinge when the door is opened at an angle of about 90°.

FIG. 20 is a top view illustrating an example state of the hinge when the door is opened at an angle of about 90°. FIG. 21 is a bottom view illustrating an example state of the hinge when the door is opened at an angle of about 90°.

As shown in the drawings, when the door 20 is further opened by the user's manipulation and then opened at an angle of about 90°, the hinge 40 can rotate more than the state in FIG. 18.

In detail, the main link 42 can further rotate in the forward direction, and the first sub-link 43 and the second sub-link 44 can rotate in the reverse direction. Here, the hinge 40 can have the space S defined between the main link 42 and the first sub-link 43, the second sub-link 44 and the door bracket 45.

Here, the upper cover 25 can shield most of the space S between the main link 42 and the first sub-link 43, the second sub-link 44, and the door bracket 45. Thus, when viewed from the upper side, the upper cover 25 can shield both the first sub-link 43 and the second sub-link 44 and can be in a state of extending up to the end of the main link 42.

Thus, the space S between the main link 42 and the first sub-link 43, the second sub-link 44, and the door bracket 45 may not be exposed upward, and thus, the user's fingers or other objects may not get caught in the hinge.

In some examples, the lower cover 24 can also shield most of the space S between the main link 42 and the first sub-link 43, the second sub-link 44, and the door bracket 45 from the lower side, like the upper cover 25.

As described above, in the state in which the door 20 is opened by an angle of about 90°, most of the space S between the links generated when the hinge 40 operates can be shielded by the cover member 26 so as not to be exposed, and thus, the user's safety can be ensured.

Figure 22:
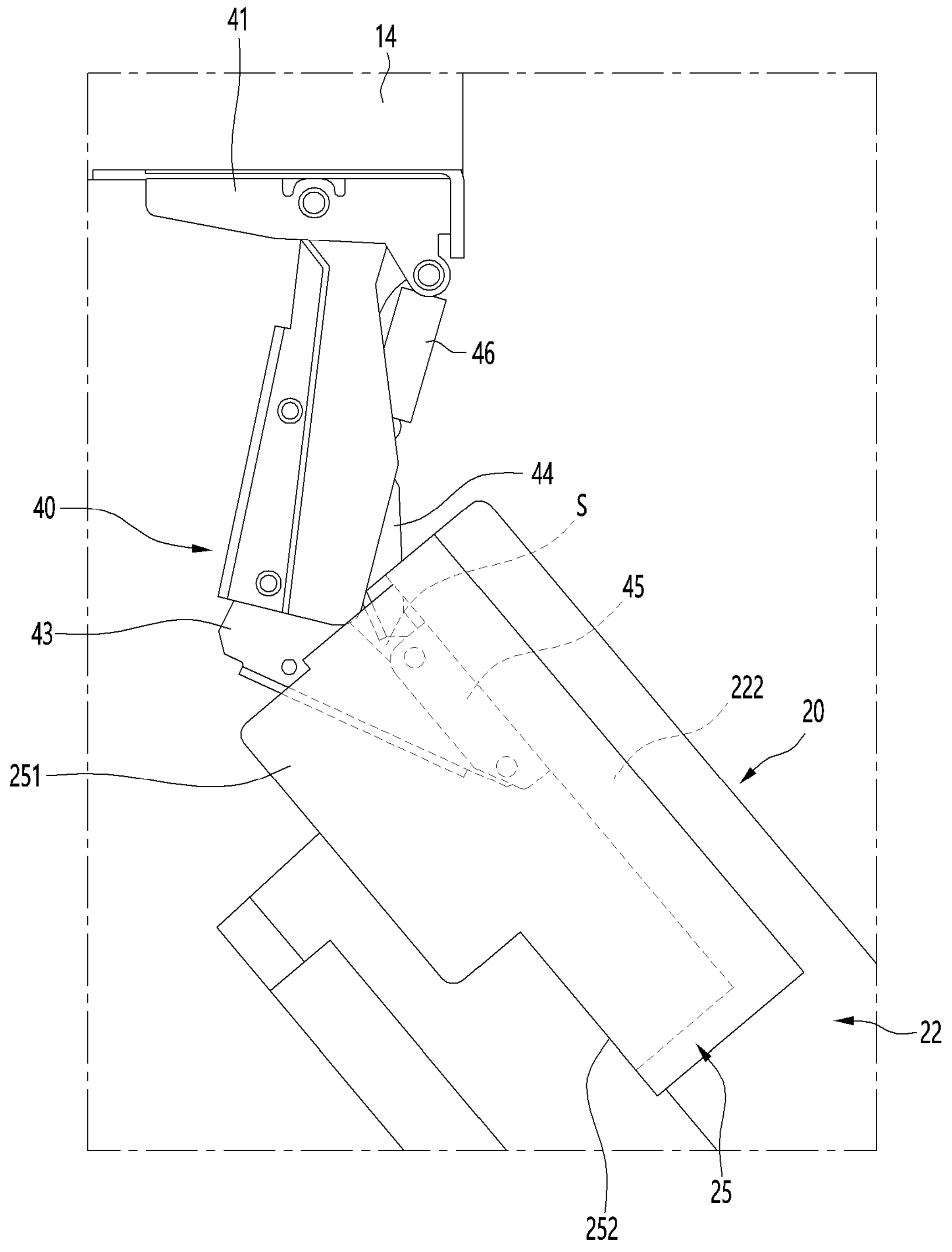
FIG. 22 is a top view illustrating an example state of the hinge when the door is fully opened.
Figure 23:
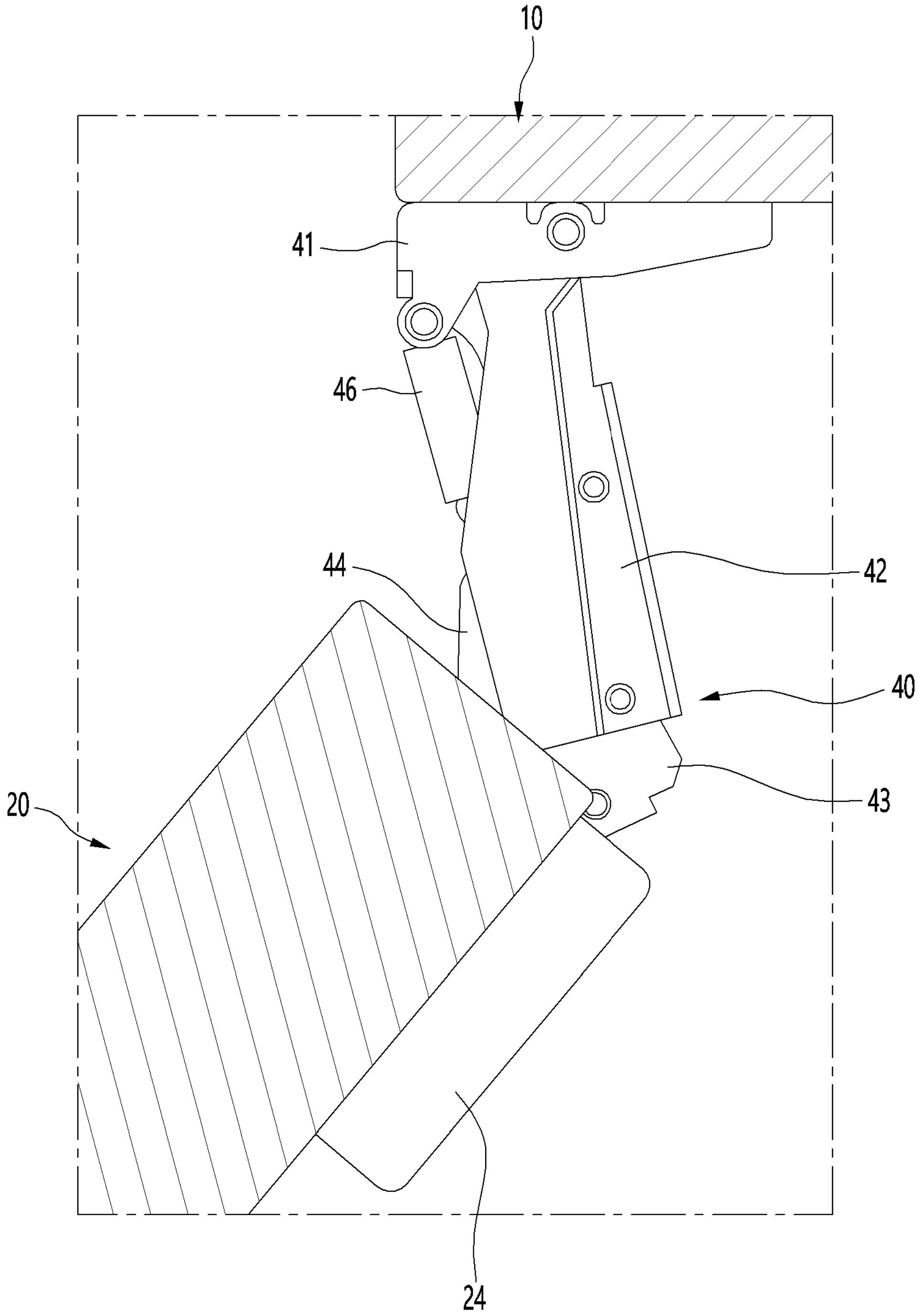
FIG. 23 is a bottom view illustrating an example state of the hinge when the door is fully opened.

FIG. 22 is a top view illustrating an example state of the hinge when the door is fully opened. FIG. 23 is a bottom view illustrating a state of the hinge when the door is fully opened.

As shown in the drawings, when the door 20 is fully opened by the user's manipulation and then opened at an angle of about 130°, the rotation of the hinge 40 can be stopped to complete the operation thereof.

In some examples, when the hinge 40 rotates, the main link 42, the first sub-link 43, the second sub-link 44, and the door bracket 45 can be in contact with each other, and thus, the space S between the main link 42 and the first sub-link 43, the second sub-link 44, and the door bracket 45 can be reduced so that the main link 42, the first sub-link 43, the second sub-link 44, and the door bracket 45 are in contact with each other.

However, until the door 20 is completely opened, the space S between the main link 42 and the first sub-link 43, the second sub-link 44, and the door bracket 45 can be generated and can be shielded by the cover member 26.

That is, the upper cover 25 can shield the space S between the main link 42 and the first sub-link 43, the second sub-link 44, and the door bracket 45. Thus, when viewed from the upper side, the upper cover 25 can shield both the first sub-link 43 and the second sub-link 44 and can be in a state of extending up to the end of the main link 42.

Thus, the space S between the main link 42 and the first sub-link 43, the second sub-link 44, and the door bracket 45 may not be exposed upward, and thus, the user's fingers or other objects may not get caught in the hinge 40.

In some examples, the lower cover 24 can also shield the space S between the main link 42 and the first sub-link 43, the second sub-link 44, and the door bracket 45 from the lower side, like the upper cover 25.

As described above, until the door 20 is fully opened, most of the space S between the links generated when the hinge 40 operates can be shielded by the cover member 26 so as not to be exposed, and thus, the user's safety can be ensured.

After the door 20 is opened, the user can perform an operation to close the door 20, and while the door 20 is closed, the hinge 40 and the leg 90 can operate in reverse order of the above-described processes.

Hereinafter, the structure in which the hinge 40 is mounted on the door 20 and the cabinet 10 will be described in detail.

Figure 24:
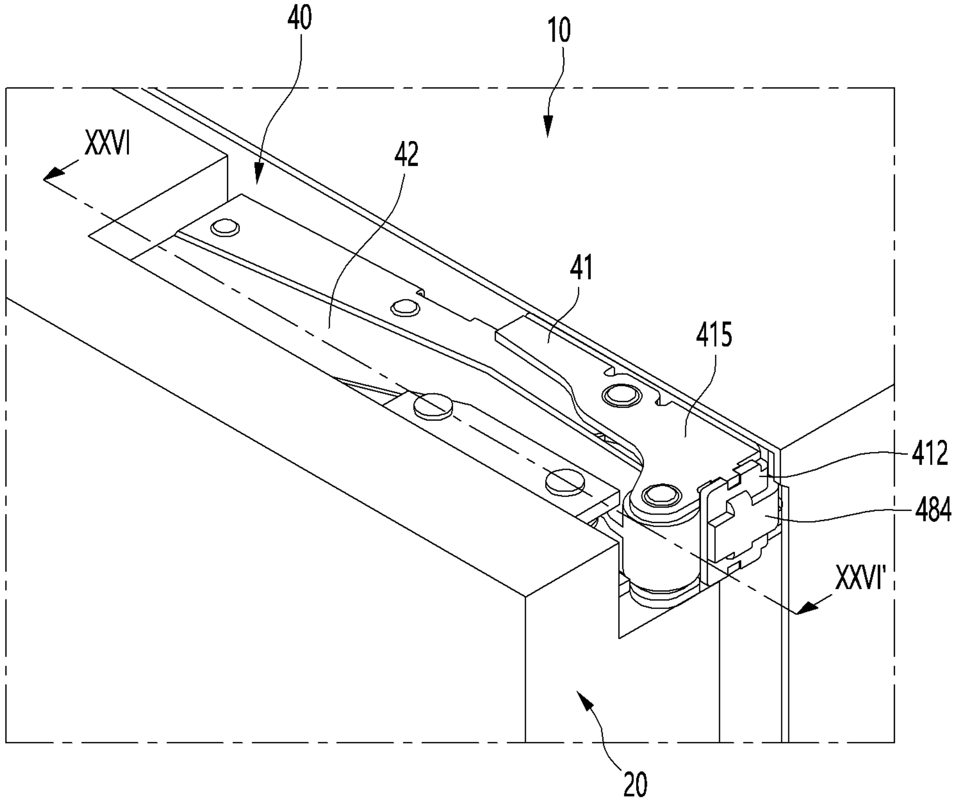
FIG. 24 is a partial perspective view illustrating an example state in which the upper hinge is mounted when the upper door is closed.
Figure 25:
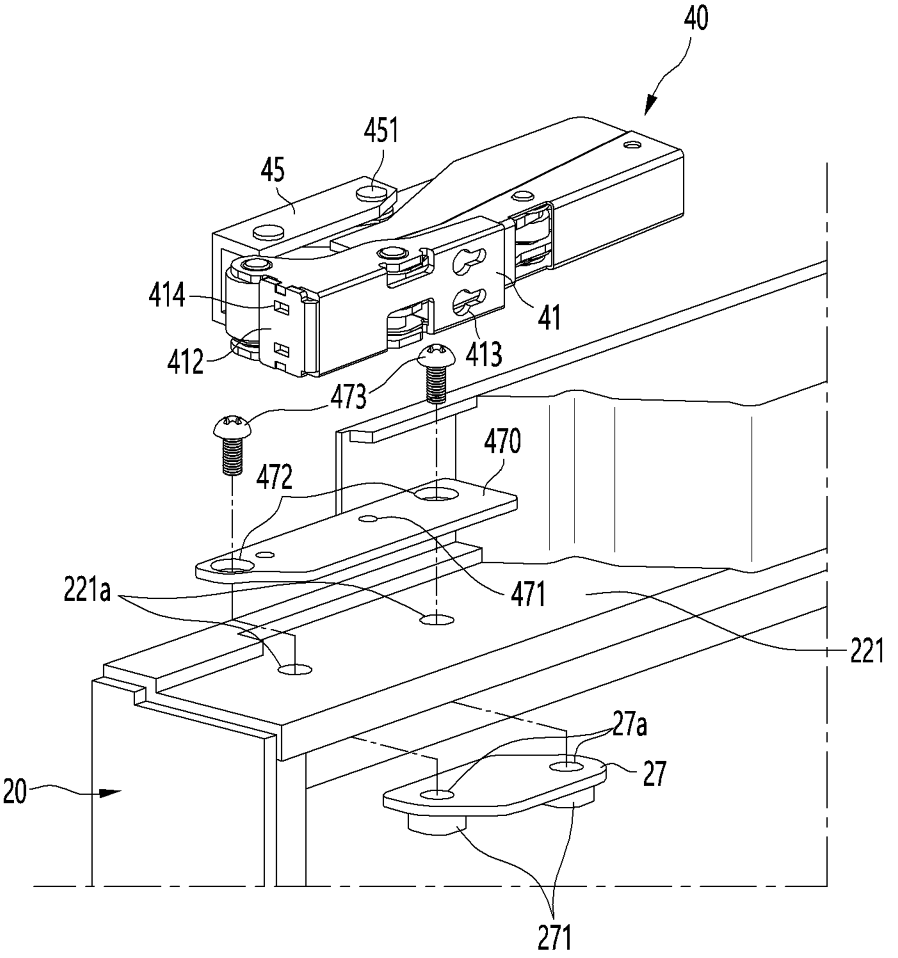
FIG. 25 is an exploded perspective view illustrating an example of a coupling structure of the upper hinge and the upper door.

FIG. 24 is a partial perspective view illustrating an example state in which the upper hinge is mounted when the upper door is closed. FIG. 25 is an exploded perspective view illustrating an example coupling structure of the upper hinge and the upper door.

Looking at the structure of the upper hinge 40 in more detail, the upper hinge 40 can include a hinge bracket 41 mounted on the cabinet 10 and a main link 42 axially coupled to the hinge bracket 41.

The hinge bracket 41 can be provided in a plate shape made of a metal material, and a top surface and a bottom surface thereof can be bent to define an accommodation space in which a plurality of links to be described later are accommodated.

In detail, the hinge bracket 41 can include a base portion 411 fixed in contact with the cabinet 10 and a side portion 412 extending forward from one end of the base portion 411.

The base portion 411 can be provided in a plate shape, and the base portion 411 can have a through-hole 413 into which a coupling member such as a screw is inserted so as to be fixed and mounted on a cabinet bracket 48 to be described later.

The through-hole 413 can be provided in plurality, which are vertically spaced apart from each other at a position corresponding to the coupling hole 482*a* of the cabinet bracket 48.

In some examples, the through-hole 413 can be defined by connecting a plurality of holes having different diameters to each other. With this structure, there is an advantage that the insertion and assembly processes of the coupling member are easier.

In some examples, a fixing groove 414 recessed inward can be formed in the side portion 412 so that the fixing portion 484 of the cabinet bracket 48 is inserted. The fixing groove 414 can be provided in plurality, which are spaced apart from the side portion 412 in the vertical direction.

A side portion 415 bent and extending forward from upper and lower ends of the base portion 411 can be further provided. The side portion 415 can be bent perpendicularly to the base portion 411 to extend forward.

In some examples, the upper hinge 40 can include a first sub-link 43 and a second sub-link 44, which are axially coupled to the main link 42.

Each of the links 42, 43, 44, and 45 can be axially coupled to define a quadrilateral shape as a whole and can be folded or unfolded to provide a trajectory through which the upper door 20 rotates.

In some examples, the upper hinge 40 can be axially coupled to ends of the first sub-link 43 and the second sub-link 44 and include a door bracket 45 coupled to the top surface of the upper door 20.

The door bracket 45 can be provided at a position facing the hinge bracket 41. That is, the door bracket 45 can define a portion of a front surface of the upper hinge 40.

In detail, the door bracket 45 can include a front surface defining a portion of the front surface of the upper hinge 40, and a top surface and a bottom surface respectively extending backward from upper and lower ends of the front surface.

The front surface of the door bracket 45 can be provided in a plate shape. In some examples, each of the upper and bottom surfaces of the door bracket 45 can be provided in a shape that does not interfere with movement of the plurality of links. For example, each of the top and bottom surfaces of the door bracket 45 can include an inclined surface of which one side is inclined.

In some examples, the door bracket 45 includes a door bracket hole 451 through which a rotation shaft of each of the first and second sub-links 43 and 44 passes. The door bracket hole 451 can be provided in a plurality in each of the top and bottom surfaces of the door bracket 45.

For example, the plurality of links and the door bracket 45 is rotatably connected to the rotation shaft. In some examples, the rotation shaft can also be connected to an upper hinge plate 470 to be described later so that the upper hinge 40 is fixed to the upper door 20.

In some examples, the upper hinge 40 can include an upper hinge plate 470 screw-coupled to the upper door 20.

The upper hinge plate 470 can be seated on the hinge mounting portion 221 disposed on the top surface of the upper door 20 to serve to couple the upper hinge 40 to the upper door 20. The upper hinge plate 470 can be provided in a plate shape and include a plurality of through-holes so that the upper hinge 40 is fixed and mounted on the upper door 20.

In detail, the upper hinge plate 470 can include a plate hole 471 defined so that the rotation shaft passing through the door bracket 45 pass therethrough. The plate hole 471 can be defined at a position corresponding to the door bracket hole 451 defined in the door bracket 45.

Therefore, the rotation shaft passing through the door bracket hole 451 can pass through the upper hinge plate hole 471, and when the upper hinge 40 is mounted on the upper door 20, the upper hinge 40 can be prevented from being separated from the upper door 20.

In some examples, the upper hinge plate 470 can include a hinge coupling hole 472 through which a coupling member passes so that the top surface of the upper door 20 is screw-coupled and fixed.

The hinge coupling hole 472 can be provided in a pair at both sides of the upper hinge plate 470. In some examples, in the state in which the door bracket 45 is coupled to the upper hinge plate 470, the hinge coupling hole 472 can extend further outward than the door bracket 45. In detail, a lengths of the upper hinge plate 470 in the left and right direction can be greater than that of the door bracket 45 in the left and right direction.

In this implementation, the upper hinge plate 470 has been described as an example as one configuration of the upper hinge 40, but the upper hinge plate 470 can be separately provided or provided as one configuration in that the upper hinge plate 470 is mounted and fixed on the hinge mounting portion 221 of the upper door 20. For example, the upper hinge plate 470 can correspond to a configuration of the lower cover 24 described above.

As described above, the upper hinge 40 can be mounted on the cabinet bracket 48 provided on the top surface of the cabinet 10, be mounted on the front end of the cabinet 10, and be connected to the rear surface of the upper door 20.

In some examples, the cabinet bracket 48 can include a fixing portion 484 extending forward from one side of the coupling portion 482. In some examples, the fixing portion 484 can be connected to the coupling portion 482 in a somewhat rounded shape, as illustrated in FIG. 4. That is, the fixing portion 484 can include a round portion 486 bent so as to be rounded forward from one end of the coupling portion 482. This round portion 486 can allow the coupling portion 482 and the fixing portion 484 to be connected more elastically. Thus, in the process of assembling or repairing the upper hinge 40, there is an advantage of preventing the cabinet bracket 48 from being damaged by an external impact.

In some examples, the fixing portion 484 can be in contact with a portion of a side surface of the upper hinge 40. In detail, a vertical lengths of the fixing portion 484 can be less than that of the upper hinge 40. In some examples, a length of the fixing portion 484 in the front and rear direction can be a length corresponding to the length of the hinge bracket 41 of the upper hinge 40 in the front and rear direction. That is, the fixing portion 484 can be provided in a structure surrounding a portion of the side surface of the upper hinge 40.

In some examples, the fixing portion 484 can be fixed by inserting a pair of restriction protrusions 487 and 489, which are provided by protruding from upper and lower ends, respectively, into the fixing groove 414 defined in the side of the upper hinge 40.

The restriction protrusions 487 and 489 can protrude from the upper or lower end of the fixing portion 484 to provide an extension portion 487*a* of which one side surface is rounded and an insertion portion 487*b* extending from one end of the extension portion 487*a* and inserted into the fixing groove 414.

With the structure of the fixing portion 484, the cabinet bracket 48 can fix one side surface of the upper hinge 40. Thus, the upper hinge 40 can be more firmly fixed and mounted on the cabinet bracket 48, and the upper hinge 40 can be prevented from being separated from the cabinet bracket 48 by the rotation of the upper door and the external impact.

A hinge cover 14 can be provided on the top surface of the cabinet 10 to shield the cabinet bracket 48 from the upper side, thereby preventing the cabinet bracket 48 from being exposed to the outside.

The upper hinge 40 can be mounted on a hinge mounting portion 221 disposed on the top surface of the upper door. Hereinafter, the structure in which the upper hinge 40 is mounted on the upper door 20 will be described in detail.

Figure 26:
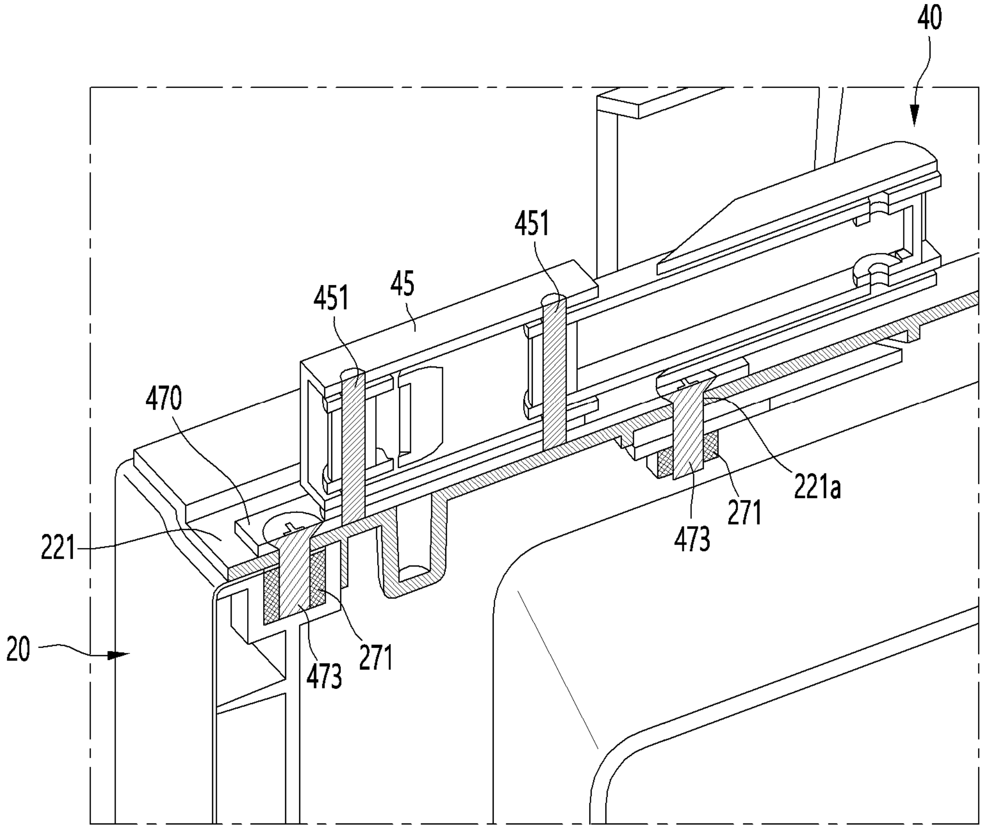
FIG. 26 is a cross-sectional view taken along line XXVI-XXVI' FIG. 24.

As illustrated in FIGS. 25 and 26, the hinge mounting portion 221 recessed so that the upper hinge 40 is mounted can be disposed on the top surface of the upper door 20. In some examples, the hinge mounting portion 221 can include a partially stepped surface.

The upper hinge 40 can be mounted on the hinge mounting portion 221. That is, a rear surface and one surface of the upper hinge 40 can be fixed to be mounted on the cabinet bracket 48, and a bottom surface of the upper hinge 40 can be fixed and mounted on the hinge mounting portion 221 of the upper door 20.

The hinge mounting portion 221 can include a screw hole 221*a* through which the coupling member 473 passing through the upper hinge plate 470 passes. The screw hole 221*a* can be defined at a position corresponding to the plate hole 471 defined in the upper hinge plate 470 in the state in which the upper hinge 40 is mounted on the hinge mounting portion 221.

The hinge mounting portion 221 can be recessed downward, and a rotation shaft mounting portion 211 into which the rotation shaft of the upper hinge 40 is inserted can be further provided. Here, the rotation shaft of the upper hinge 40 can be inserted into the rotation shaft mounting portion 211.

A fixing bracket 27 screw-coupled to the upper hinge plate 470 can be provided below the hinge mounting portion 221. The fixing bracket 27 can be provided to accommodate the rotation shaft 491 passing through the screw hole 221*a* so that the upper hinge 40 is more firmly fixed and mounted on the upper door 20.

In detail, the fixing bracket 27 includes a fixing bracket hole 27*a* defined at a position corresponding to the screw hole 221*a*. The fixing bracket hole 27*a* can be penetrated in the vertical direction so that the plate hole 471 and the coupling member passing through the screw hole 221*a* are penetrated.

In some examples, the fixing bracket 27 can include a boss portion 271 extending downward from the fixing bracket hole 27*a*. That is, the boss portion 271 can extend downward from a bottom surface of the fixing bracket 27. In some examples, the boss portion 271 can have a screw thread on an inner circumferential surface thereof and thus can be screw-coupled to the coupling member 473.

That is, in the upper hinge 40, the coupling member such as the screw can sequentially pass through the bracket coupling hole 482*a*, the screw hole 221*a*, and the plate hole 471 and then be screw-coupled to the boss portion 271 and fixed to the upper door 20.

With this structure, without interfering with a moving trajectory of the upper hinge 40, the coupling member can be easily fixed and mounted on the upper door 20 and thus be simply assembled and more firmly mounted on the upper door 20 through the screw coupling.

In some examples, the upper hinge 40 can be screw-coupled to the upper door 20 so that a portion of a load of the upper door 20 is pulled upward. Thus, the center hinge 60 may not support all of the load of the upper door 20. Thus, burden of the center hinge 60 supporting the load of the upper door 20 can be relatively reduced. Therefore, even if the center hinge has a relatively thin thickness in the vertical direction compared to the upper hinge 40 or the lower hinge 50, the drooping of the upper door 20 can be effectively prevented.

Hereinafter, the lower hinge 50 rotatably supporting the lower door 30 will be described with reference to the drawings.

Figure 27:
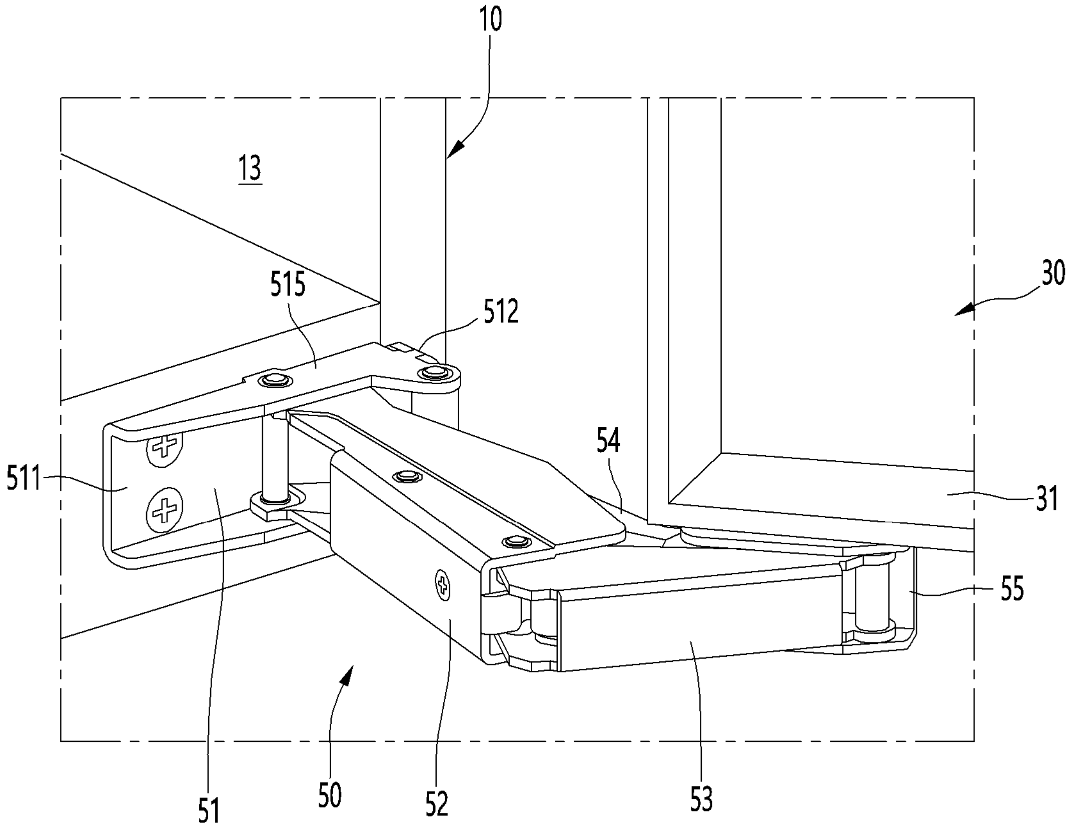
FIG. 27 is a partial perspective view illustrating an example state in which a lower hinge is mounted.
Figure 28:
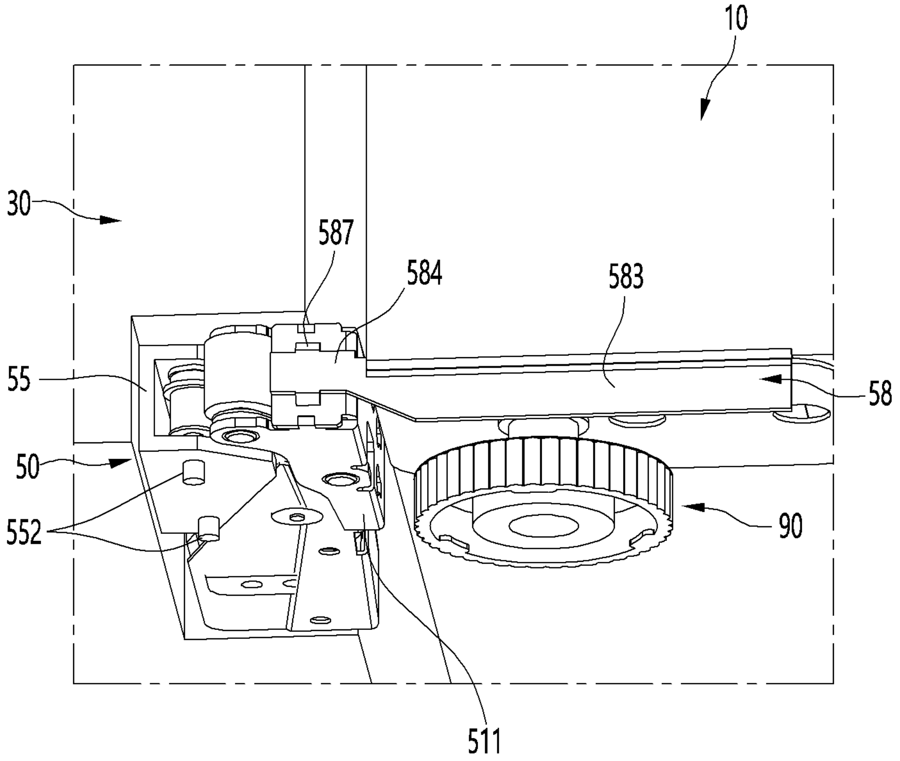
FIG. 28 is a partial perspective view illustrating an example state in which the lower hinge is mounted.

FIG. 27 is a partial perspective view illustrating an example state in which a lower hinge is mounted. FIG. 28 is a partial perspective view illustrating an example state in which the lower hinge is mounted.

In some implementations, the lower hinge 50 can be mounted on a front lower end of the cabinet 10 to rotatably support a lower end of the lower door 30 at a lower side.

The lower door 30 can be provided in a pair like the upper door 20 and can be disposed at both left and right sides. A width of the lower door 30 can be the same as the upper door 20, and thus, the front surface of the refrigerator 1 can be symmetrically disposed when viewed from a front side.

In some examples, the lower door 30 can rotate along the same trajectory as the upper door 20. Thus, the lower hinge 50 for the rotation of the lower door 30 can have substantially the same structure as the upper hinge 40.

That is, the lower hinge 50 includes a lower hinge bracket 51 mounted on the cabinet 10 and a main link axially coupled to the lower hinge bracket 51.

The lower hinge bracket 51 can include a lower base portion 511 fixed in contact with the cabinet 10 and a lower side portion 512 extending forward from one end of the lower base portion 511.

The lower base portion 511 can be provided in a plate shape, and the lower base portion 511 can have a lower connection hole 513 into which a coupling member such as a screw is inserted so as to be fixed and mounted on a cabinet bracket 58 to be described later.

The lower connection hole 513 can be provided in plurality, which are vertically spaced apart from each other at a position corresponding to the coupling hole 482*a* of the lower cabinet bracket 58.

In some examples, the lower connection hole 513 can be defined by connecting a plurality of holes having different diameters to each other. With this structure, there is an advantage that the insertion and assembly processes of the coupling member are easier.

In some examples, a lower fixing groove 514 recessed inward can be formed in the lower side portion 512 so that the lower fixing portion 484 of the lower cabinet bracket 58 is inserted. The lower fixing groove 514 can be provided in plurality, which are spaced apart from the lower side portion 512 in the vertical direction.

A lower side portion 515 bent and extending forward from upper and lower ends of the lower base portion 511 can be further provided. The lower side portion 515 can be bent perpendicularly to the lower base portion 511 to extend forward.

In some examples, the lower hinge 50 can include a first sub-link 53 and a second sub-link 54, which are axially coupled to the main link 52. In some examples, the lower hinge 50 can be axially coupled to ends of the first sub-link 53 and the second sub-link 54 and include a lower door bracket 55 coupled to the bottom surface of the lower door 30.

The lower door bracket 55 can be provided at a position facing the lower hinge bracket 51. The lower door bracket 55 includes a front surface, and a top surface and a bottom surface, which extend backward from upper and lower ends of the front surface, respectively.

In some examples, each of the top and bottom surfaces of the lower door bracket 55 includes a lower door bracket hole 551 through which the rotation shaft 552 connecting the first sub-link 53 to the second sub-link 54 passes. A plurality of lower door bracket holes 551 can be defined in each of the top and bottom surfaces.

The lower hinge 50 can further include a lower hinge plate 57 passing through the coupling member so as to be mounted and fixed to the bottom surface of the lower door 30.

The lower hinge plate 57 includes a lower plate hole 571 through which the lower hinge rotation shaft passes so that the lower door bracket 55 and the lower hinge plate 57 are fixed.

A length of the lower hinge plate 57 in the left and right direction can be greater than that of the lower door bracket 55. Thus, while the lower door bracket 55 is coupled to the lower hinge plate 57, the lower hinge 50 can be fixed and mounted to the lower door 30.

The lower plate hole 571 can be provided in plurality at positions corresponding to the lower door bracket holes 551.

In some examples, the lower hinge plate 57 can further include a lower hinge coupling hole 572 through which the bracket protrusion 34 to be described later passes so as to be fixed and mounted on the bottom surface of the lower door 30.

The lower hinge coupling holes 572 can be provided in plurality, which are spaced apart from the lower door bracket hole 551. In some examples, the lower hinge coupling hole 572 can be defined at a position so as not to be in contact with the lower door bracket 55 in the state in which the lower door bracket 55 is coupled to the lower hinge plate 57. With this structure, the lower hinge 50 can be provided in a pair on the outermost side to easily fix the lower hinge 50 to the lower door 30.

According to an implementation, the lower hinge plate 57 has been described as being included in the configuration of the lower hinge 50, but the lower hinge plate 57 can be separately provided or can be provided as one configuration of the lower door 30 in that the lower hinge plate 57 is mounted and fixed to the bottom surface of the lower door 30.

Hereinafter, the structure in which the lower hinge is mounted on the cabinet and the lower door will be described in detail.

Figure 29:
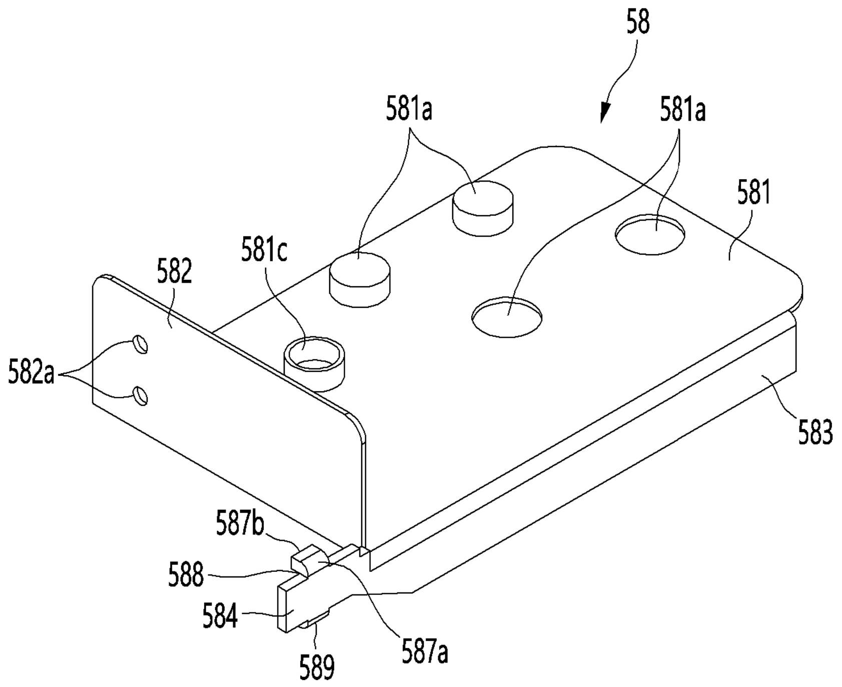
FIG. 29 is a perspective view illustrating an example of a lower cabinet bracket.
Figure 30:
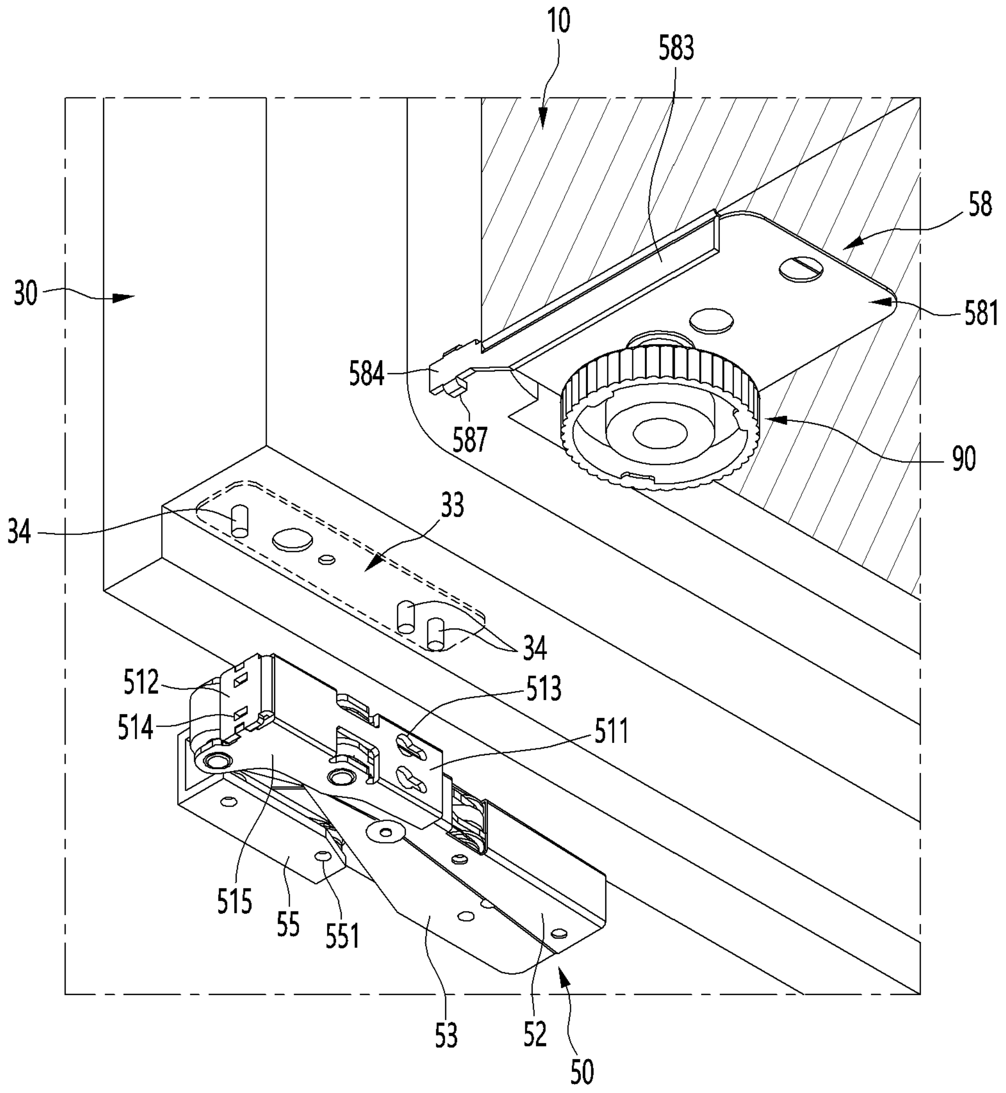
FIG. 30 is a view illustrating an example state of the lower hinge that is separated from the lower door.
Figure 31:
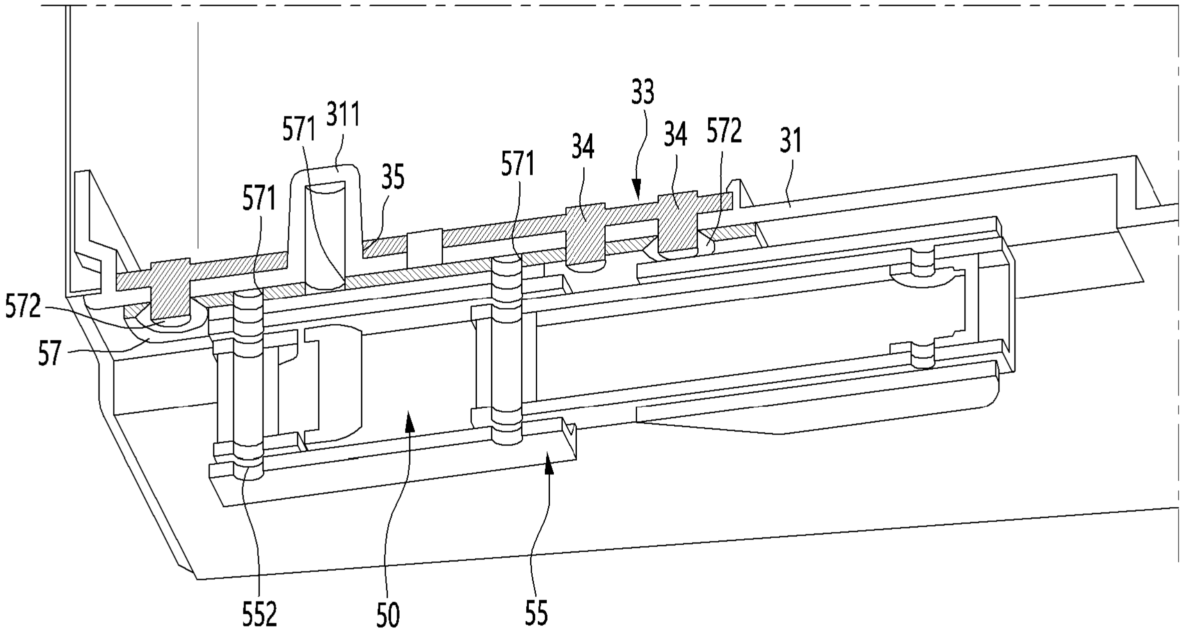
FIG. 31 is a cross-sectional view taken along line XXXI-XXXI' of FIG. 1.

FIG. 29 is a perspective view illustrating the lower cabinet bracket. FIG. 30 is a view illustrating an example state in which the lower hinge is separated from the lower door. FIG. 31 is a cross-sectional view taken along line XXXI-XXXI' of FIG. 1.

As shown in the drawings, in the lower hinge 50, the top surface of the lower door bracket 55 can be coupled to the bottom surface of the lower door 30, and the rear surface and one side surface of the lower hinge bracket 51 can be coupled to the front surface of the cabinet 10.

A lower cabinet bracket 58 fixing the lower hinge 50 can be provided on the bottom surface of the cabinet 10.

The lower cabinet bracket 58 includes a lower support portion 581 extending forward and backward along the bottom surface of the cabinet 10 and a lower coupling portion 582 bent upward from a front end of the lower support portion 581.

The lower support portion 581 can include a cabinet fixing portion 581*a* protruding upward from the top surface and fixed to the bottom surface of the cabinet 10 and a cabinet fixing hole 581*b* through which the coupling member such as the screw passes to be fixed to the bottom surface of the cabinet 10.

The cabinet fixing portion 581*a* and the cabinet fixing hole 581*b* can be spaced apart from each other and be provided in plurality.

In some examples, a leg fixing portion 581*c* fixing a leg 90 that prevents the refrigerator from being inverted can be further provided in front of the lower support portion 581. An inner circumferential surface of the leg fixing portion 581*c* can be provided as a screw thread, and a screw portion of the leg 90 can be inserted to be screw-coupled.

The lower coupling portion 582 can be bent to extend upward from a front end of the lower coupling portion 582, thereby restricting the rear surface of the lower hinge 50.

The lower coupling portion 582 can have a lower coupling hole 582*a* penetrated in the front and rear direction. The lower coupling hole 582*a* can be provided in plurality at positions corresponding to the lower connection holes 513 defined in the lower hinge bracket 51.

The lower coupling hole 582*a* and the lower connection hole 513 can be coupled to each other by the coupling member such as the screw, and thus, the lower hinge 50 can be fixed to the cabinet 10.

In some examples, the lower cabinet bracket 58 can include a lower bent portion 583 extending downward from one end of the lower support portion 581 and a lower fixing portion 584 extending forward from the lower bent portion 583 to restrict one side surface of the lower hinge 50.

The lower bent portion 583 can be bent and extends downward from a side end that is close to the side surface of the cabinet 10 among both side ends of the lower support portion 581. The lower bent portion 583 can extend from a front end to a rear end of the lower support portion 581.

In some examples, the lower fixing portion 584 can be disposed on a front end of the lower bent portion 583. A lower protrusion 587 protruding outward can be disposed on each of upper and lower ends of the lower fixing portion 584. In detail, the lower fixing portion 584 can include a first lower protrusion 588 protruding upward from the upper end and a second lower protrusion 589 protruding downward from the lower end.

The lower protrusion 587 can be partially inserted into the lower fixing groove 514 of the lower hinge bracket 51 to restrict the side surface of the lower hinge 50.

In some examples, the lower protrusion 587 can include a lower extension portion 587*a* having one side rounded and a lower insertion portion 587*b* extending from one end of the lower extension portion 587*a* and inserted into the lower fixing groove 514.

The lower extension portion 587*a* can protrude outward in the state in which the lower hinge 50 is fixed to the lower cabinet bracket 58, and the lower insertion portion 587*b* can be inserted into the lower fixing groove 514. In some examples, the lower extension portion 587*a* can be disposed in a direction crossing the lower fixing portion 584, and a top surface of the lower extension portion 587*a* can be flat.

With the structure of the lower fixing portion 584, the lower cabinet bracket 58 can fix one side surface of the lower hinge 50. Thus, the lower hinge 50 can be more firmly fixed and mounted on the lower cabinet bracket 58, and the lower hinge 50 can be prevented from being separated from the lower cabinet bracket 58 by the rotation of the lower door and the external impact.

One side surface of the lower hinge 50 can be fixed together with the rear surface of the lower hinge 50 by the lower cabinet bracket 58 and thus can be more firmly mounted on the cabinet 10.

The lower hinge 50 can be accommodated in a lower hinge mounting portion 31 that is recessed upward in the bottom surface of the lower door 30.

A lower fixing bracket 33 connected to the lower hinge plate 57 can be provided above the lower hinge mounting portion 31. The lower fixing bracket 33 can be provided inside the lower door 30 and can be disposed above the bottom surface of the lower door 30.

The lower fixing bracket 33 includes the bracket protrusion 34 protruding downward to pass through the lower hinge plate 57. The bracket protrusion 34 can be provided in plurality, which are spaced apart from each other in the horizontal direction, and when the lower hinge 50 is mounted on the lower hinge mounting portion 31, the bracket protrusion 34 can have a height capable of passing through the lower hinge coupling hole 572.

The lower fixing bracket 33 can further include a fixing bracket hole 35 penetrating vertically. The fixing bracket hole 35 can be provided in plurality, and the rotation shaft of the lower hinge 50 can pass through the fixing bracket hole 35. In some examples, a fixing pin capable of fixing the lower hinge 50 and the lower door 30 can be additionally inserted into the fixing bracket hole 35 to more firmly fix the lower hinge 50 and the lower door 30.

With this structure, in the lower hinge 50, the bracket protrusion 34 can pass through the lower connection hole 513 and the lower coupling hole 582*a* and be fixed to the lower door 30 in the state in which the lower hinge plate 57 is mounted on the lower hinge mounting portion 31.

The lower hinge mounting portion 31 can be recessed downward, and a rotation shaft mounting portion 311 into which the rotation shaft of the lower hinge 50 is inserted can be further provided. Here, the rotation shaft of the lower hinge 50 can be inserted into the rotation shaft mounting portion 311.

Hereinafter, the center hinge 60 and the mounting structure of the center hinge 60 will be described in detail.

Figure 32:
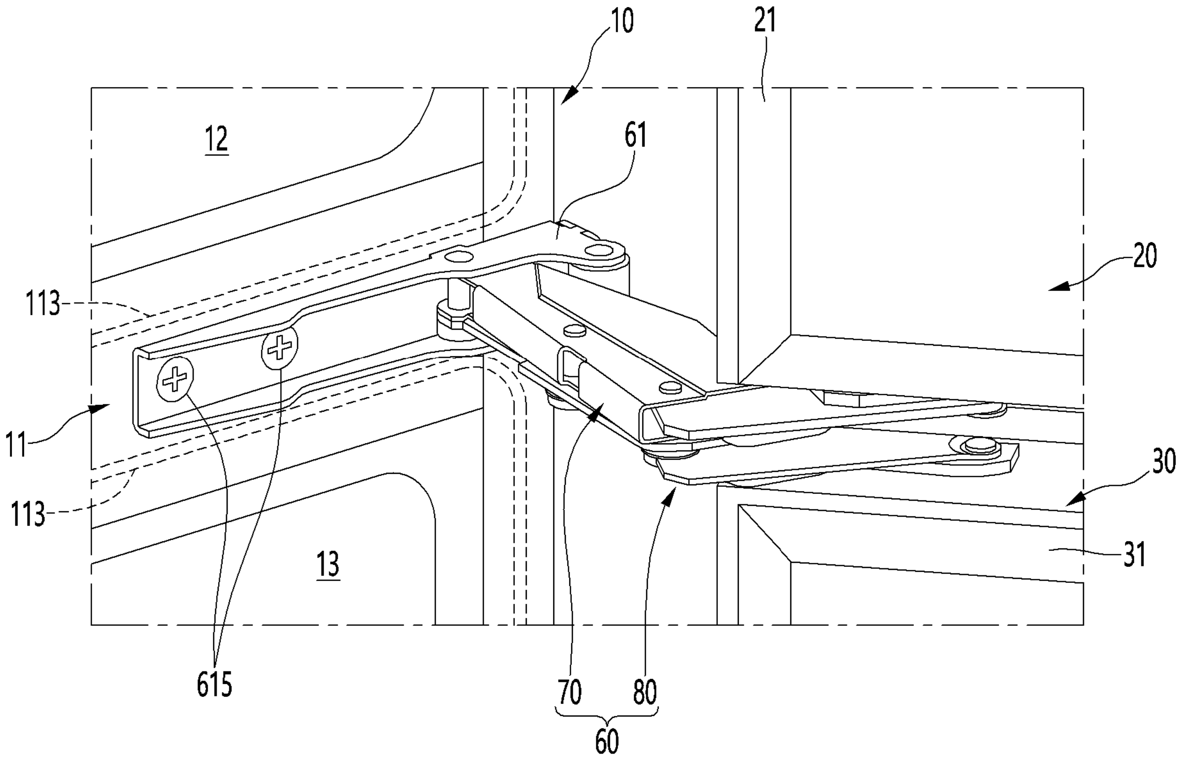
FIG. 32 is a partial perspective view illustrating an example of a center hinge.
Figure 33:
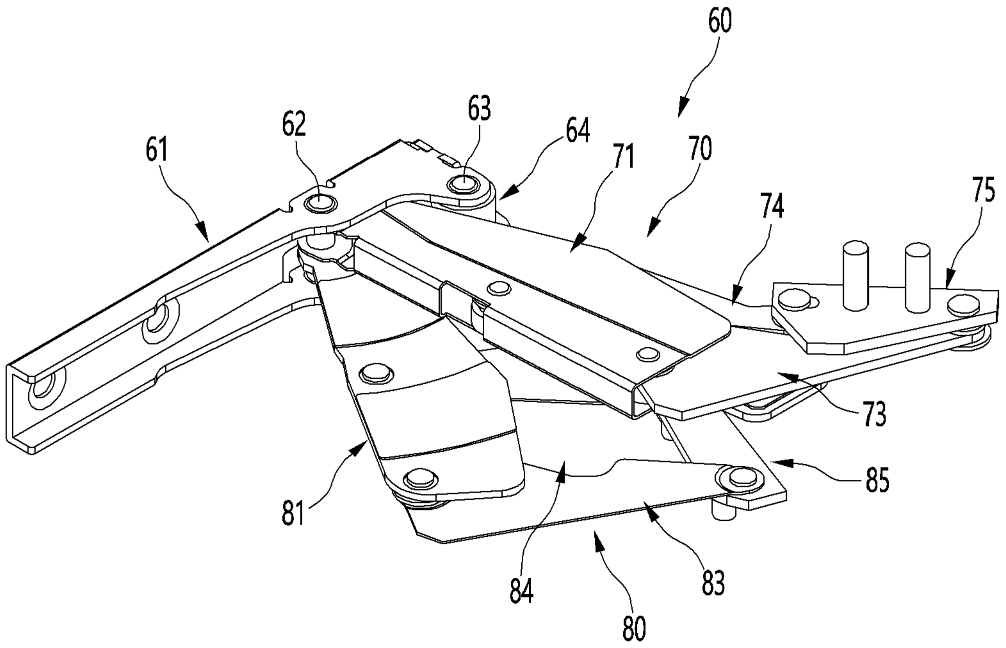
FIG. 33 is a perspective view illustrating an example state of the center hinge that is unfolded at a predetermined angle.
Figure 34:
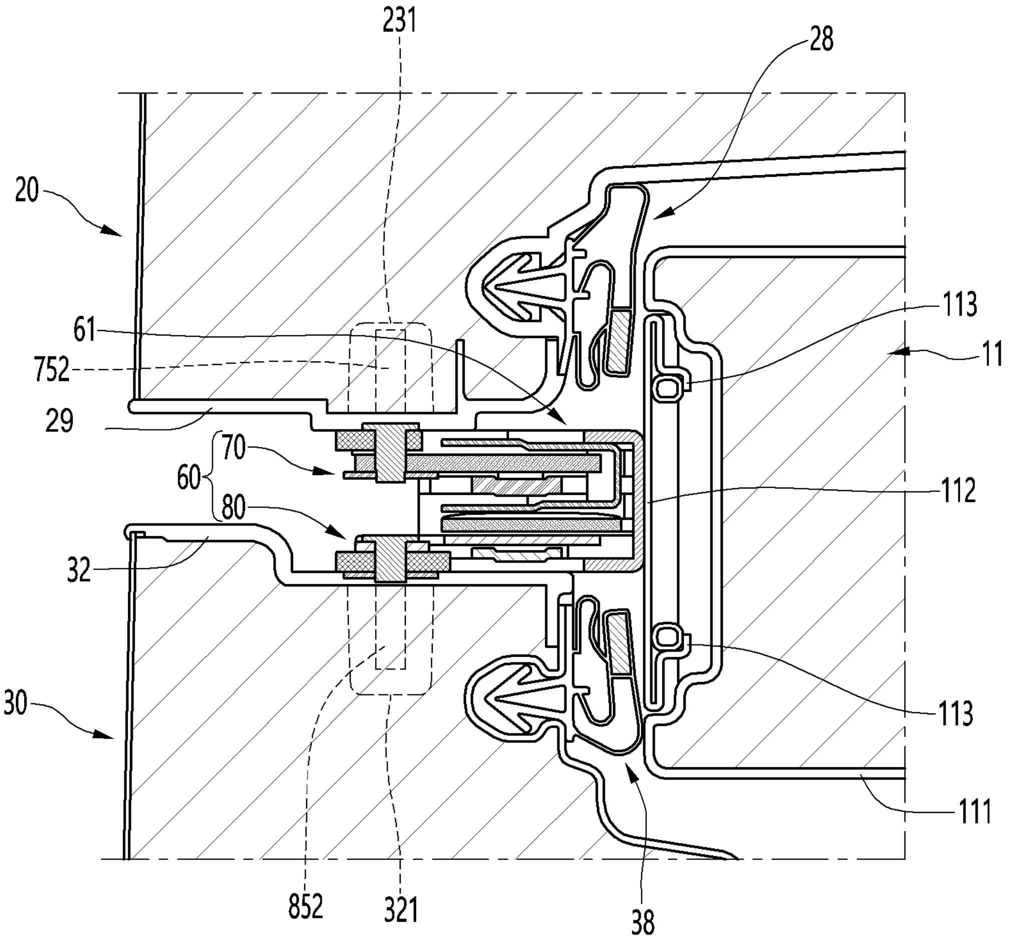
FIG. 34 is a cross-sectional view taken along line XXXIV-XXXIV' of FIG. 1.

FIG. 32 is a partial perspective view illustrating an example state in which the center hinge is mounted. FIG. 33 is a perspective view illustrating an example state of the center hinge that is unfolded at a predetermined angle. FIG. 34 is a cross-sectional view taken along line XXXIV-XXXIV' of FIG. 1.

In some implementations, the center hinge 60 rotatably supports the upper door 20 and the lower door 30. The center hinge 60 can be disposed in a space between the bottom surface of the upper door 20 and the top surface of the lower door 30 and can be mounted on the front surface of the cabinet 10.

The center hinge 60 can be mounted on a front surface of the barrier 11 and be connected to the bottom surface of the upper door 20 and the top surface of the lower door 30, respectively, so that the upper door 20 and the lower door 30 rotate independently.

That is, the center hinge 60 can include a center hinge bracket 61 mounted on the barrier 11 and an upper link module 70 and a lower link module, which are constituted by a plurality of links that are axially coupled to the center hinge bracket 61. The upper link module 70 can be coupled to the bottom surface of the upper door 20, the lower link module 80 can be coupled to the top surface of the lower door 30.

In some examples, the upper link module 70 can have a structure that supports the upper door 20 at a lower side. Thus, possibility of drooping or deformation of the upper door 20 due to a load thereof can be relatively high. Thus, the upper link module 70 can have a thickness greater than that of the lower link module 80 to prevent the upper link module 70 from drooping or being deformed downward by the load of the upper door 20.

The vertical width of the hinge bracket 61 can be determined according to the vertical width of the barrier 11. The barrier 11 can be designed to have a thickness at which the upper storage space 12 and the lower storage space 13 are partitioned in an adiabatic state.

To maximally secure a storage capacity of each of the upper storage space 12 and the lower storage space 13, the vertical width of the center hinge 60 can be minimized.

In some examples, to minimize the vertical width of the center hinge 60, the upper link module 70 and the lower link module 80 can be disposed together on one hinge bracket 61. In some examples, the center hinge 60 can have a compact structure to occupy a minimum space between the cabinet 10, the upper door 20, and the lower door 30.

The center hinge bracket 61 can include a center base portion 611 fixed in contact with the cabinet 10 and a center side portion 612 that is bent to extend forward from each of upper and lower ends of the center base portion 611.

A plurality of coupling holes 613 can be defined in the center base portion 611. A coupling member such as a screw 615 can be inserted into the plurality of coupling holes to allow the center hinge bracket 61 to be fixed and mounted on the front surface of the cabinet 10.

The upper link module 70 and the lower link module 80 are configured to have basically the same rotation trajectory, but only have a difference in thickness and coupling structure due to the thickness, and thus, lengths and coupling structures of the links can be the same as or similar to each other.

The upper link module 70 and the lower link module 80 are mounted to the hinge bracket 61 to have the same rotation axis, but can rotate independently. The main rotation shaft 62 and the sub rotation shaft 63 mounted on the hinge bracket 61 can be disposed to pass through both the upper link module 70 and the lower link module 80, and the upper link module 70 and the lower link module 80 can be spaced apart from each other so that the upper link module 70 and the lower link module 80 do not interfere with each other during the rotation.

The upper link module 70 can include the upper main link 71, the first upper sub-link 73, the second upper sub-link 74, and the door bracket 75. Here, the first upper sub-link 73 and the second upper sub-link 74 can be rotatably connected to each other between the upper main link 71 and the door bracket 75. In some examples, the upper link module 70 can further include the upper connection link 72 connecting the second upper sub-link 74 to the hinge bracket 61.

In some examples, the lower link module 80 can have the same planar shape as the upper link module 70 as a whole and can have the same structure and shape as the upper link module 70 when viewed from an upper side even in the state of being folded or unfolded.

The lower link module 80 can include the lower main link 81, the first lower sub-link 83, the second lower sub-link 84, and a lower door bracket 85. Here, the first lower sub-link 83 and the second lower sub-link 84 can be rotatably connected to each other between the lower main link 81 and the door bracket 85. In some examples, the lower link module 80 can further include the lower connection link 82 connecting the second lower sub-link 84 to the hinge bracket 61.

In some examples, the center hinge 60 can include a door bracket 45 supporting the upper door 20 from the lower side.

The center hinge 60 can be disposed between the upper door 20 and the lower door 30 and can be mounted on the front surface of the cabinet 10.

In some implementations, an upper decoration 29 can be provided on the bottom surface of the upper door 20. The upper decoration 29 can define the bottom surface of the upper door 20, and an upper link mounting portion 231 can be disposed on one end of the upper decoration 29. The upper link mounting portion 231 can be recessed upward, and the upper shaft 752 of the upper link module 70 can be inserted into the upper link mounting portion 231. That is, the door bracket 45 can be coupled to the upper link mounting portion 231, and thus, the upper link module 70 can be mounted to support the upper door 20 at the lower side and rotate by the upper link module 70.

A lower decoration 32 can be provided on the bottom surface of the lower door 30. The lower decoration 32 can define the top surface of the lower door 30, and the lower link mounting portion 321 can be disposed on one end of the lower decoration 32. A lower shaft 852 of the lower link module 80 can be inserted into the lower link mounting portion 321. That is, the door bracket 55 can be coupled to the lower link mounting portion 321, and thus, the lower door 30 can rotate by the lower link module 80.

In some examples, the center hinge 60 can be mounted on a front surface of the barrier plate 112 defining a front surface of the barrier 11. In some examples, the center hinge 60 can be disposed at an intermediate portion in a vertical height of the barrier 11.

The barrier 11 can include a barrier case 111 in which an insulator is accommodated therein, and the barrier plate 112 defining the front surface of the barrier 11. In some examples, a pair of heating members 113 can be disposed on a rear surface of the barrier plate 112. The heating members 113 can be disposed at positions corresponding to the upper door gasket 28 and the lower door gasket 38 on the rear surfaces of the upper door 20 and the lower door 30, respectively.

In some examples, the center hinge 60 can be disposed between the heating members 113. With this structure, even if the hinge bracket 61 is mounted on the barrier 11 by coupling the screw, the heating members 113 can be prevented from being damaged, and the upper door gasket 28 and the lower door gasket 38 can be prevented from interfering with the center hinge 60.

The present disclosure has been described as an example in the case the multi-joint link hinge is applied to the refrigerator, but the same principle can be applied to other home appliances requiring the hinge device connecting the cabinet to the door. For example, the multi-joint link hinge can be applied to a washing machine, a microwave oven, a plant cultivation apparatus, a clothes processing apparatus, and the like.

The following effects can be expected in the multi-joint link hinge and the refrigerator including the same according to the proposed implementations.

In the refrigerator according to the implementation, the door can be connected by the hinge having the multi-joint link structure to secure the opening/closing operation of the door without interfering with the adjacent furniture or home appliances.

In addition, due to the structural characteristics of the hinge having the multi-link structure, the hinge can have the space between the plurality of links during the operation, but the space between the links can be shielded by the cover member provided on the door to previously prevent the safety accidents such as the jamming of the fingers.

In addition, the cover member can extend so that the cover member is inserted into the hinge cover in the state in which the door is closed to completely shield the hinge and also can be prevented from interfering with the cabinet even when the door is opened and closed.

In addition, the refrigerator according to the implementation can include the cabinet bracket fixed to the cabinet and coupled to the hinge to prevent the door from drooping due to the load thereof.

In addition, the fixing bracket screw-coupled to the hinge to fix the hinge can be provided under the top surface of the door, thereby allowing the hinge to be more firmly fixed and mounted on the upper door.

In addition, in the state in which the bottom surface of the hinge is mounted on the door, and the rear surface and one side surface of the hinge are mounted on the cabinet bracket, the hinge can be fixed and mounted on the cabinet. That is, in the state in which the cabinet bracket is mounted on the hinge, the cabinet bracket can be seated and fixed on the top surface of the cabinet. Therefore, the installation and assembly of the refrigerator can be simplified.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A multi-joint link hinge comprising:

a hinge bracket comprising:

- a base portion that defines a plurality of screw coupling holes at a vertical surface thereof,
- a plurality of side portions that extend from the base portion in a horizontal direction and are spaced apart from each other in a vertical direction, and
- a side surface portion that extends from the base portion in the vertical direction and defines a fixing groove;

a plurality of links coupled between the plurality of side portions along an axis that extends in the vertical direction;

a door bracket coupled to the plurality of links, the door bracket defining door bracket holes at each of top and bottom surfaces thereof;

a hinge plate that is disposed above or below the door bracket and defines (i) a plate hole at a position corresponding to one of the door bracket holes and (ii) a hinge coupling hole that extends through the hinge plate;

a coupling member that is coupled to the hinge coupling hole and passes through the hinge plate, the coupling member being located laterally outside the door bracket such that the coupling member does not overlap with the door bracket in a direction in which the coupling member is coupled to the hinge coupling hole; and a fixing bracket that is screw-coupled to the hinge plate and defines a fixing bracket hole that receives the coupling member, wherein the hinge plate and the fixing bracket are spaced apart from each other with an object being disposed therebetween, and the door bracket is coupled to the object.

2. The multi-joint link hinge according to claim 1, further comprising a screw that passes through one of the plurality of screw coupling holes.

3. The multi-joint link hinge according to claim 1, further comprising a rotation shaft that passes through the plurality of links, wherein the door bracket is configured to face the hinge bracket, and wherein the rotation shaft passes through the door bracket holes.

4. The multi-joint link hinge according to claim 1, wherein the plurality of links comprise:

a main link rotatably disposed at the hinge bracket;

a first sub-link rotatably coupled to a first side of the main link; and a second sub-link rotatably coupled to a second side of the main link and spaced apart from the first sub-link.

5. A multi-joint link hinge comprising:

a hinge bracket comprising:

a base portion that defines a plurality of screw coupling holes at a vertical surface thereof; and a plurality of side portions that extend from the base portion in a horizontal direction and are spaced apart from each other in a vertical direction;

a plurality of links coupled between the plurality of side portions along an axis that extends in the vertical direction, a door bracket coupled to the plurality of links, the door bracket defining a door bracket hole at each of top and bottom surfaces thereof;

a rotation shaft that passes through the plurality of links and the door bracket holes, the rotation shaft protruding from the top and bottom surfaces of the door bracket;

a hinge plate that is disposed above or below the door bracket and defines a plate hole at a position corresponding to one of the door bracket holes and a hinge coupling hole that receives a coupling member, the rotation shaft passing through the plate hole; and a fixing bracket that is screw-coupled to the hinge plate and defines a fixing bracket hole that receives the coupling member.

6. A refrigerator comprising:

a cabinet that defines a storage space;

a cabinet bracket disposed at a top surface of the cabinet or a bottom surface of the cabinet;

a door configured to, based on rotating relative to the cabinet, open and close at least a portion of the storage space; and a hinge that connects the door to the cabinet, wherein the door defines a hinge mounting portion that is disposed at an end of the door and recessed relative to a top surface of the door or a bottom surface of the door, the hinge mounting portion being configured to mount the hinge, wherein the hinge comprises:

a hinge bracket coupled to the cabinet bracket, a door bracket disposed at the top surface of the door or the bottom surface of the door, a plurality of links coupled between the hinge bracket and the door bracket, a hinge plate that is disposed on one surface of the hinge mounting portion and screw-coupled to the hinge mounting portion by a coupling member passing though the hinge plate, a rotation shaft that passes through the plurality of links and the hinge plate, and a fixing bracket disposed below the hinge mounting portion and screw-coupled to the hinge plate.

7. The refrigerator according to claim 6, wherein the hinge bracket comprises a base portion and a side surface portion that extends from the base portion, and wherein the cabinet bracket comprises:

a support portion disposed along the top surface of the cabinet;

a coupling portion that extends upward from a front end of the support portion and is coupled to the base portion of the hinge bracket; and a fixing portion that extends from one end of the coupling portion and is coupled to the side surface portion of the hinge bracket.

8. The refrigerator according to claim 7, wherein the fixing portion comprises a restriction protrusion that protrudes from each of upper and lower ends of the fixing portion, and wherein the side surface portion of the hinge bracket defines a fixing groove that receives one of the restriction protrusions.

9. The refrigerator according to claim 6, wherein the door bracket defines a door bracket hole at each of top and bottom surfaces thereof, and wherein the rotation shaft passes through the door bracket holes and the plurality of links, the rotation shaft protruding from the top and bottom surfaces of the door bracket.

10. The refrigerator according to claim 6, wherein the plurality of links comprise:

a main link rotatably disposed at the hinge bracket;

a first sub-link rotatably coupled to a first side of the main link; and a second sub-link rotatably coupled a second side of the main link and spaced apart from the first sub-link.

11. A refrigerator comprising:

a cabinet that defines a storage space;

a cabinet bracket disposed at a top surface of the cabinet;

a hinge cover that covers the cabinet bracket, the hinge cover defining a cover opening at a front side thereof;

a door configured to, based on rotating relative to the cabinet, open and close at least a portion of the storage space, the door defining a hinge mounting portion recessed from a top surface of the door;

a door bracket disposed at the hinge mounting portion;

a hinge bracket disposed at the cabinet bracket;

a plurality of links that connect the hinge bracket to the door bracket; and an upper cover disposed at the hinge mounting portion and configured to cover the door bracket, wherein a portion of the upper cover is configured to insert into the cover opening based on the door being closed, and wherein the upper cover is fixed to the door and configured to overlap with the top surface of the cabinet based on the door being closed.

12. The refrigerator according to claim 11, wherein the hinge mounting portion is defined at an end of the door, and wherein the upper cover protrudes rearward relative to a rear end of the hinge mounting portion.

13. The refrigerator according to claim 11, further comprising a lower cover that extends rearward from a bottom surface of the hinge mounting portion and is configured to cover a lower side of the hinge bracket.

14. The refrigerator according to claim 11, wherein the hinge cover is disposed on the top surface of the cabinet and accommodates the cabinet bracket, and wherein the upper cover has an extending end that is configured to, based on the door being closed, face the cabinet and insert into the cover opening.

15. The refrigerator according to claim 11, wherein the upper cover comprises a plurality of coupling protrusions and a cover rib that extend downward from a bottom surface of the upper cover and are configured to cover a space between the upper cover and the hinge bracket.

* * * * *